United States Patent
Li et al.

(10) Patent No.: US 10,187,254 B2
(45) Date of Patent: Jan. 22, 2019

(54) PERSONALIZATION ACCORDING TO MOOD

(71) Applicants: Kevin A. Li, New York, NY (US);
Troy C. Meuninck, Newnan, GA (US);
Robert Raymond Miller, II, Convent Station, NJ (US); James H. Pratt, Round Rock, TX (US); Horst J. Schroeter, New Providence, NJ (US);
Behzad Shahraray, Holmdel, NJ (US)

(72) Inventors: Kevin A. Li, New York, NY (US);
Troy C. Meuninck, Newnan, GA (US);
Robert Raymond Miller, II, Convent Station, NJ (US); James H. Pratt, Round Rock, TX (US); Horst J. Schroeter, New Providence, NJ (US);
Behzad Shahraray, Holmdel, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 299 days.

(21) Appl. No.: 13/647,430

(22) Filed: Oct. 9, 2012

(65) Prior Publication Data
US 2014/0101296 A1    Apr. 10, 2014

(51) Int. Cl.
*G06F 15/177*    (2006.01)
*H04L 12/24*    (2006.01)
*G06Q 30/02*    (2012.01)

(52) U.S. Cl.
CPC ......... *H04L 41/0813* (2013.01); *G06Q 30/02* (2013.01)

(58) Field of Classification Search
USPC ................................... 709/221, 220
See application file for complete search history.

(56) References Cited

U.S. PATENT DOCUMENTS

| | | | |
|---|---|---|---|
| 7,689,556 B2 | 3/2010 | Garg et al. | |
| 7,921,369 B2 | 4/2011 | Bill | |
| 8,160,549 B2 | 4/2012 | Bychkov et al. | |
| 8,621,416 B1 * | 12/2013 | Thomas | G06F 9/44505 706/45 |
| 2007/0089125 A1 * | 4/2007 | Claassen | H04H 60/33 725/9 |
| 2009/0140864 A1 * | 6/2009 | Aaron | G06Q 30/02 340/573.1 |
| 2010/0011388 A1 * | 1/2010 | Bull | H04N 21/41407 725/9 |
| 2010/0057875 A1 * | 3/2010 | Bychkov | G06Q 50/24 709/206 |
| 2010/0064014 A1 * | 3/2010 | McLaughlin | H04L 67/24 709/206 |
| 2010/0144328 A1 * | 6/2010 | Keating | H04L 67/1095 455/414.3 |
| 2011/0179116 A1 | 7/2011 | Solomon et al. | |

(Continued)

*Primary Examiner* — Vivek Srivastava
*Assistant Examiner* — Hermon Asres
(74) *Attorney, Agent, or Firm* — Scott P. Zimmerman, PLLC

(57) ABSTRACT

Methods, systems, and products predict emotional moods. Predicted moods may then be used to configure devices and machinery. A communications device may be configured to a mood of a user. A car may adjust to the mood of an operator. Even assembly lines may be configured, based on the mood of operators. Machinery and equipment may thus adopt performance and safety precautions that account for varying moods.

18 Claims, 25 Drawing Sheets

(56) References Cited

U.S. PATENT DOCUMENTS

| | | |
|---|---|---|
| 2011/0231512 A1 | 9/2011 | Sathish et al. |
| 2011/0239137 A1* | 9/2011 | Bill .................. G06F 17/30749 |
| | | 715/757 |
| 2011/0294526 A1 | 12/2011 | Gafrick et al. |
| 2012/0047219 A1 | 2/2012 | Feng et al. |
| 2012/0095976 A1 | 4/2012 | Hebenthal et al. |
| 2012/0124122 A1 | 5/2012 | el Kaliouby et al. |
| 2012/0124456 A1* | 5/2012 | Perez ..................... G06Q 30/02 |
| | | 715/200 |
| 2012/0130196 A1* | 5/2012 | Jain ...................... A61B 5/0022 |
| | | 600/300 |
| 2012/0136959 A1 | 5/2012 | Kadam et al. |
| 2012/0151351 A1 | 6/2012 | Kilroy et al. |
| 2012/0158503 A1 | 7/2012 | Mardikar |
| 2012/0191338 A1 | 7/2012 | French et al. |

* cited by examiner

PERSONALIZATION ACCORDING TO MOOD

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

Personalization of electronics is common. People may personalize their computer settings. People may personalize their phones and ringtones. Personalization, though, could be automatically performed.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
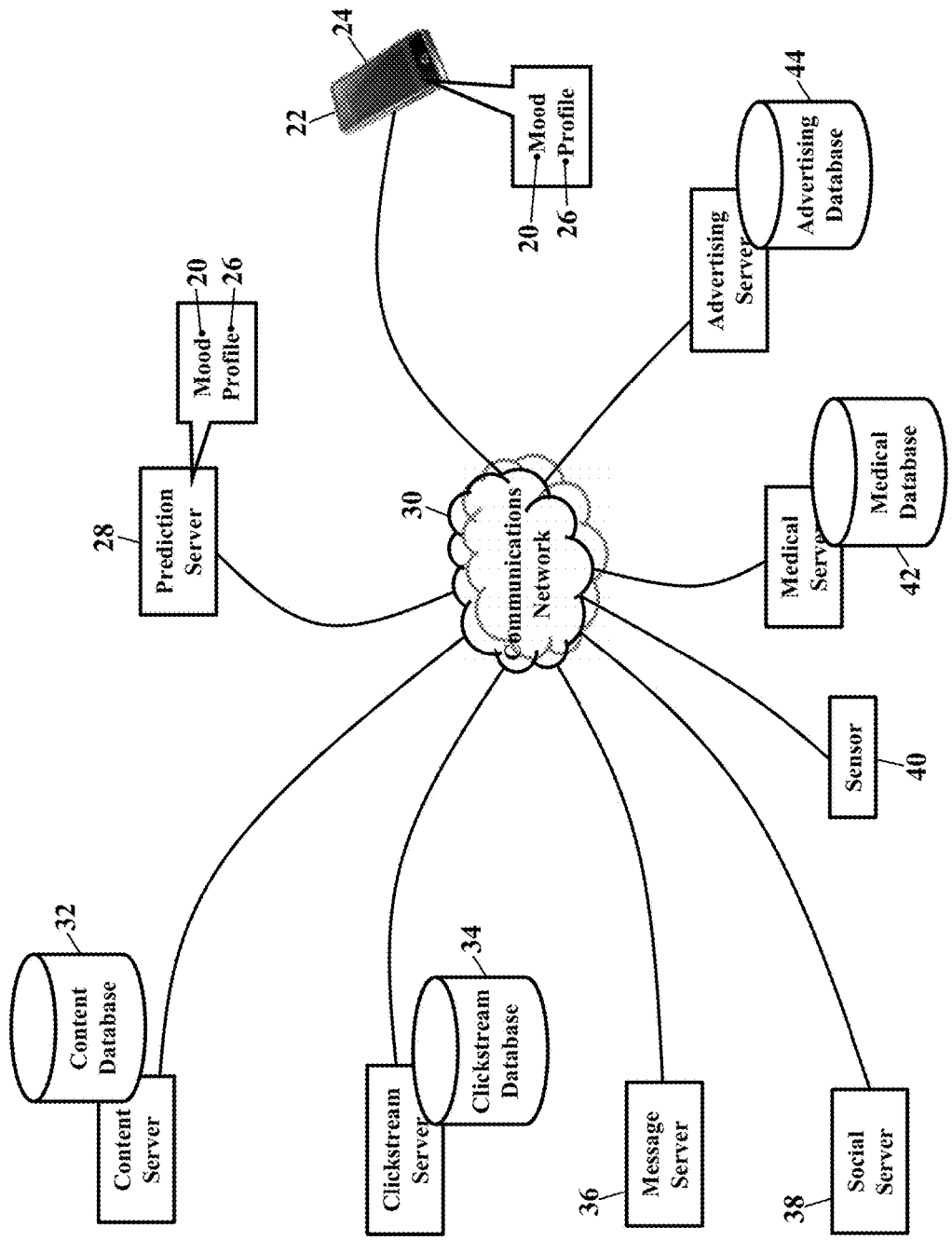
FIG. 1 is a simplified schematic illustrating an environment in which exemplary embodiments may be implemented.

FIG. 1 is a simplified schematic illustrating an environment in which exemplary embodiments may be implemented. FIG. 1 illustrates prediction of a mood 20 of a user associated with a communications device 22. The communications device 22, for simplicity, is illustrated as a smart phone 24. The predicted mood 20 may be based on a profile 26 of the user's communications device 22. A prediction server 28 and the user's communications device 22 may communicate over a communications network 30. The prediction server 28 and/or the user's communications device 22 collects information from different sources. The information is then used to predict the emotional mood 20 associated with the user. The person's mood 20 may be simply predicted as "happy," "sad," "hungry," or "angry." The mood 20, however, may be more subtly predicted as combinations or spectrums of moods ranging from "ecstatic" to "despondent" or from "hyper" to "lazy." Whatever the predicted mood 20, that mood 20 may then be exploited for advertising, targeted delivery of content, machine control, and even therapy.

FIG. 1 illustrates the collected information. Information may be collected from a content database 32 that logs the movies, music, and web pages requested by the user's communications device 22. Information may also be collected from a clickstream database 34 that stores keystrokes, commands, button pushes, and other inputs to the user's communications device 22. Information may also be collected from a message server 36 that stores texts, emails, "tweets," and other electronic messages sent and received by the user's communications device 22. Information may also be collected from a social server 38 that stores social postings from the user's communications device 22. The user's FACEBOOK® posts, for example, may be monitored and analyzed to predict the mood 20 of the user. Information may also be collected from one or more sensors 40, such as cameras, temperature sensors, sound sensors, and force sensors. Prescriptions, medical histories, and other medical records may be obtained from a medical database 42. Whatever the source, information is collected and analyzed to predict the user's mood 20.

Once the user's mood 20 is predicted, actions may be taken based on the mood 20. An advertising server 44, for example, may target advertisements to the user's communications device 22. The advertisements may be related to the predicted mood 20, or the advertisements may be anti-mood, contrary, or polar. A "sad" mood 20, for example, may result in targeted "happy" advertisements. The content database 32 may be instructed to send complementary content or contrary content. The social server 38 may be instructed to display, publish, or share the predicted mood 20 with friends on social sites. The predicted mood 20 may thus be used as an advertising opportunity, a content opportunity, and even a social opportunity.

Figure 2:
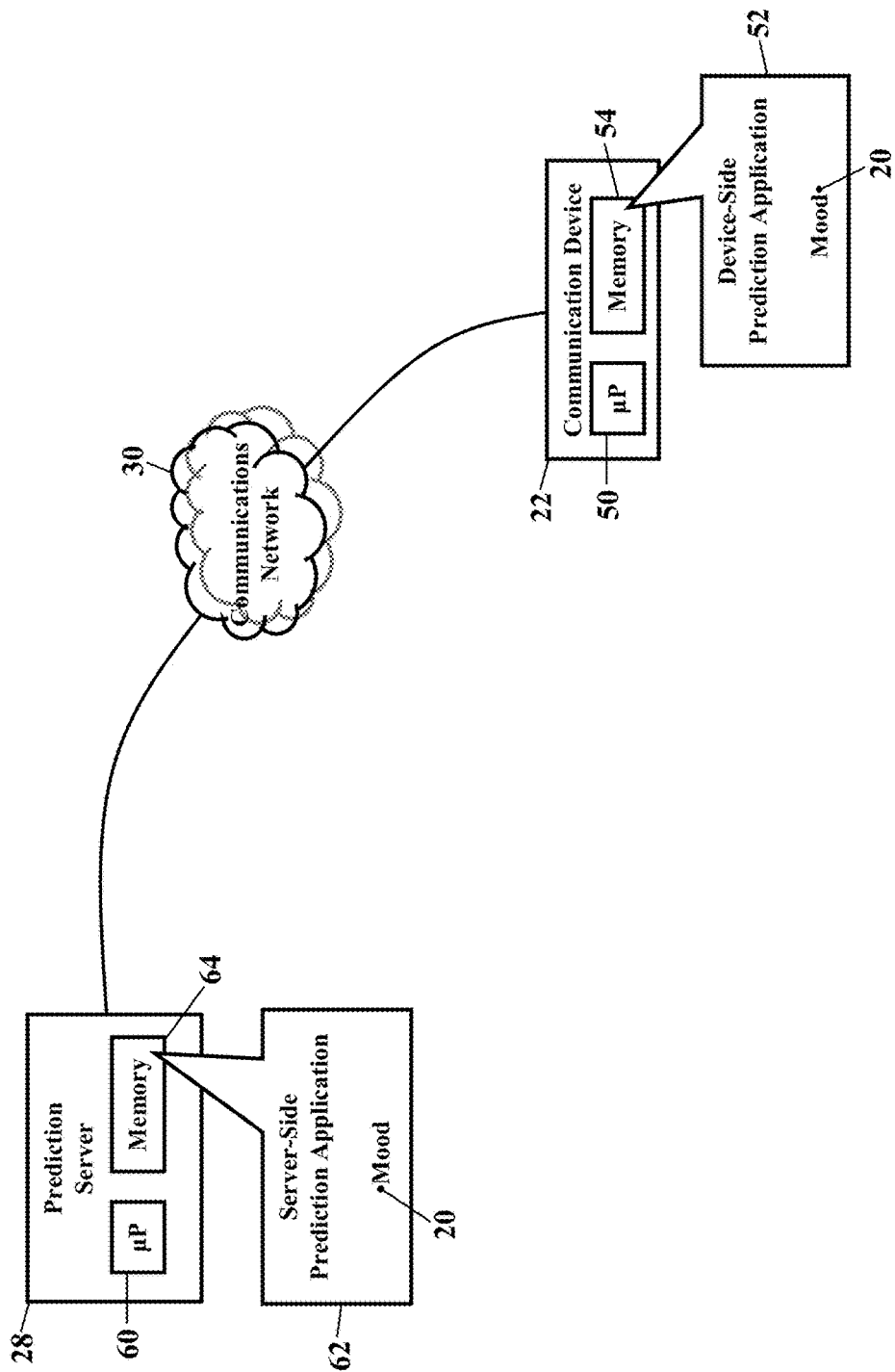
FIG. 2 is a more detailed schematic illustrating an operating environment, according to exemplary embodiments.

FIG. 2 is a more detailed schematic illustrating an operating environment, according to exemplary embodiments. The user's communications device 22 may have a processor 50 (e.g., "µP"), application specific integrated circuit (ASIC), or other component that executes a device-side prediction application 52 stored in a local memory 54. The prediction server 28 may also have a processor 60 (e.g., "µP"), application specific integrated circuit (ASIC), or other component that executes a server-side mood prediction application 62 stored in a local memory 64. The device-side prediction application 52 and/or the server-side mood prediction application 62 include instructions, code, and/or programs that infer the mood 20 of the user of the communications device 22. The user's mood 20 may be predicted solely by either the device-side prediction application 52 or the server-side mood prediction application 62. However, the device-side prediction application 52 and the server-side mood prediction application 62 may cooperate in a client-server relationship to predict the user's mood 20.

Exemplary embodiments may be applied regardless of networking environment. As the above paragraphs mentioned, the communications network 30 may be a wireless network having cellular, WI-FI®, and/or BLUETOOTH® capability. The communications network 30, however, may be a cable network operating in the radio-frequency domain and/or the Internet Protocol (IP) domain. The communications network 30, however, may also include a distributed computing network, such as the Internet (sometimes alternatively known as the "World Wide Web"), an intranet, a local-area network (LAN), and/or a wide-area network (WAN). The communications network 30 may include coaxial cables, copper wires, fiber optic lines, and/or hybrid-coaxial lines. The communications network 30 may even include wireless portions utilizing any portion of the electromagnetic spectrum and any signaling standard (such as the IEEE 802 family of standards, GSM/CDMA/TDMA or any cellular standard, and/or the ISM band). The communications network 30 may even include powerline portions, in which signals are communicated via electrical wiring. The concepts described herein may be applied to any wireless/wireline communications network, regardless of physical componentry, physical configuration, or communications standard(s).

Figure 3:
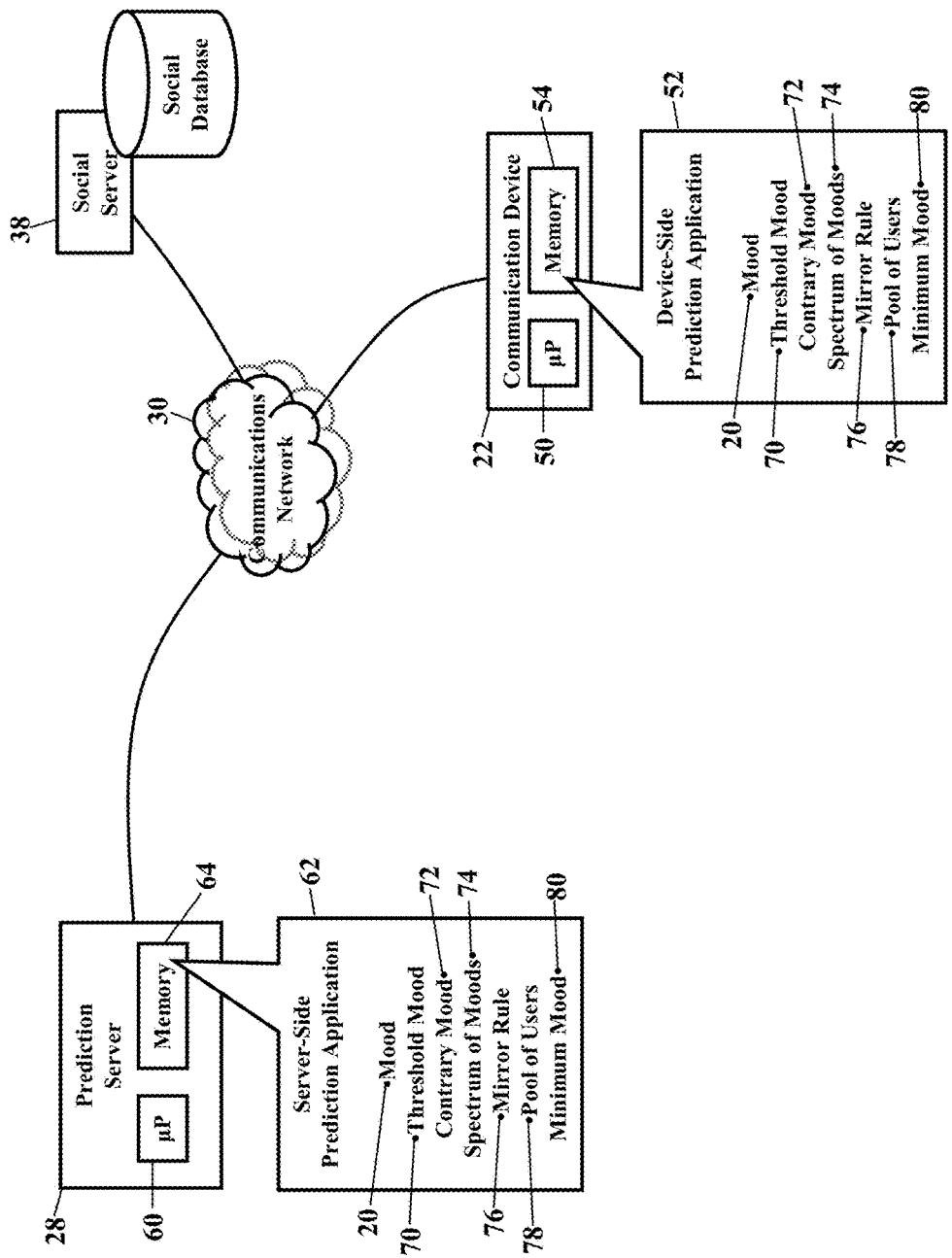
FIG. 3 is a schematic illustrating mood matching, according to exemplary embodiments.

FIG. 3 is a schematic illustrating mood matching, according to exemplary embodiments. Here, friends and even strangers may be matched to the user's predicted mood 20. Once the user's mood 20 is predicted, the social server 38 may be queried for other users having the same or similar mood 20. If the user is "happy" or "excited," for example, the user may want to be paired with other users who share the same or similar mood 20. The social server 38 may thus respond with names, addresses, and/or locations of other users having the same or similar mood 20. This group of users may thus electronically or physically meet and share their joy.

Exemplary embodiments, though, may also pair contrary moods. Those users with "sad" or "down" moods may benefit from a contrary pairing with a "happy" person. Indeed, the contrary pairing may even be therapeutic and relieve symptoms of anxiety, depression, loneliness, and other emotional issues. So, if the user's predicted mood 20 satisfies a threshold mood 70, the social server 38 may be queried for other users having a contrary mood 72. The threshold mood 70 may be a simple level of emotions (such as the aforementioned "happy," "sad," "hungry," or "angry" predictions). The threshold mood 70, however, may involve a more complicated ranking or rating of emotions that allows numerical comparisons of different moods. Regardless, if the threshold mood 70 is satisfied, exemplary embodiments may query for other users having a greater, higher, or better mood. The social server 38 may thus respond with names, addresses, and/or locations of other users having the contrary mood 72. The user expressing the low mood 20 may then be paired with one or more people having the higher, contrary mood 72.

Moods may thus be quantified. Mood matching may require that different moods be compared in order to select the contrary mood 72. Exemplary embodiments, then, may assign numerical values to different moods. A spectrum 74 of moods may be developed, and a numerical value may be assigned to each mood in the spectrum 74 of moods. Moods at a higher end of the spectrum, for example, may be assigned greater numerical values than moods near a lower end. A simple example may establish the spectrum 74 of moods as numerical values in the range one to ten ("1" to "10"). Regardless, each different mood may be assigned a different numerical value. Once the user's mood 20 is predicted, the spectrum 74 of moods may be queried for the user's mood 20. A response is received that indicates the numerical value assigned to the user's predicted mood 20.

The contrary mood 72 may then be selected. The user's predicted mood 20 is compared to the threshold mood 70. The threshold mood 70 represents any numerical value of moods at which contrary mood matching is applied. The threshold mood 70, for example, may have a numerical value of "4." Moods having numeric values less than or equal to "4" invoke contrary matching. If the user's predicted mood 20 is less or equal to the threshold mood 70, then contrary mood matching may be applied. Exemplary embodiments may then select the contrary mood 72 and query the social server 38 for users having the contrary mood 72. The social server 38 may thus respond with names, addresses, and/or locations of other users having at least the contrary mood 72.

The contrary mood 72 may be selected from the spectrum 74 of moods. Because the spectrum 74 of moods may be a ranking of different levels of moods, each different mood 20 has its own, unique numerical value. The threshold mood 70 may represent some numerical value below which contrary matching is applied. If the user's predicted mood 20 satisfies the threshold mood 70, then the contrary mood 72 may be selected. Exemplary embodiments, for example, may apply a mirror rule 76 based upon a difference between the threshold mood 70 and the user's predicted mood 20. For example, a difference in mood $M_{Dif}$ may be calculated from $$M_{Th} - M_P = M_{Dif}.$$

where $M_{Th}$ denotes the numeric value assigned to the threshold mood 70, and $M_P$ is the numeric value assigned to the user's predicted mood 20. Once the difference in mood $M_{Dif}$ is determined, the contrary mood 72 $M_{Con}$ is calculated from $$M_{Con} = M_{Th} + M_{Dif}.$$

where the difference in mood $M_{Dif}$ is mirrored about the threshold mood 70 $M_{Th}$. That is, difference in mood $M_{Dif}$ is projected forward or above the threshold mood 70 $M_{Th}$. The social server 38 may thus be queried for those users having at least the contrary mood 72 $M_{Con}$. The social server 38 may thus respond with a pool 78 of users' names, addresses, and/or locations having at least the contrary mood 72 $M_{Con}$.

The contrary mood 72 may also be selected using a minimum mood 80. The minimum mood 80 may be some minimum numerical value assigned to the contrary mood 72. That is, the minimum mood 80 is any mood in the spectrum 74 of moods above which is considered the contrary mood 72. The social server 38 may thus be queried for those users having at least the minimum mood 80. The social server 38 may thus respond with the pool 78 of user's names, addresses, and/or locations of other users having at least the minimum mood 80.

However the contrary mood 72 is determined, social introductions may then be made. Once the pool 78 of users is known, exemplary embodiments may automatically make introductions to improve the user's mood 20. The pool 78 of users may be sent to, and/or displayed by, the user's communications device 22. The user may thus be presented with the pool 78 of users having the contrary mood 72. The user may thus initiate messages to socially interact with any member of the pool 78 of users. These social interactions may thus therapeutically improve or increase the user's mood.

Figure 4:
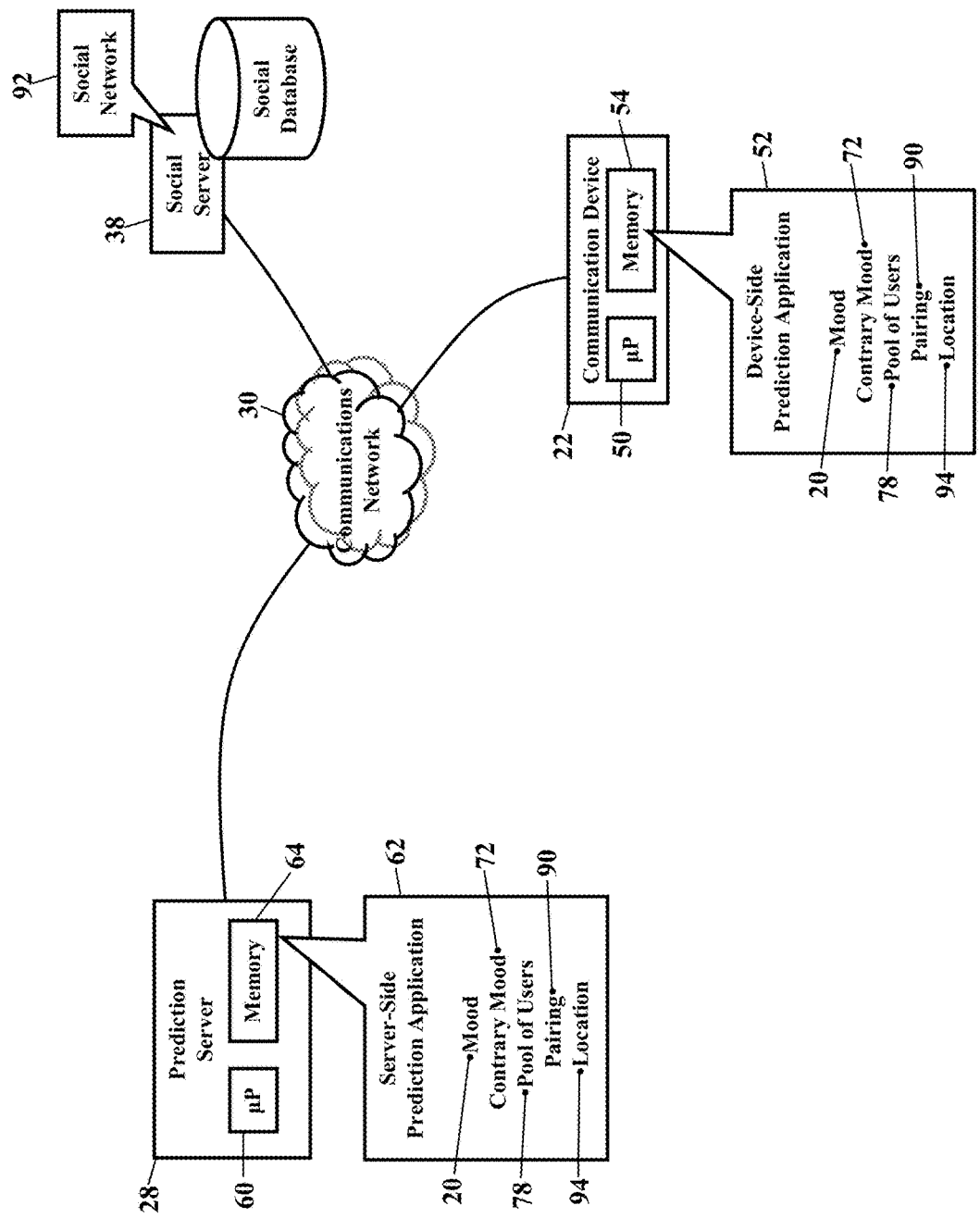
FIG. 4 is a schematic illustrating culled social interactions, according to exemplary embodiments.

FIG. 4 is a schematic illustrating culled social interactions, according to exemplary embodiments. The reader may recognize that the pool 78 of users could be too numerous and too emotionally distant for great effect. The social server 38 may stores hundreds, thousands, or even millions of users. So the pool 78 of users, having at least the contrary mood 72, may be so numerous as to be meaningless. Likewise, unknown "happy" people may have little or no emotional value. An emotionally depressed person is perhaps unlikely to respond to overwhelming stranger happiness.

So exemplary embodiments may recommend one or more pairings 90. Because the pool 78 of users may be numerous, the pool 78 of users may be culled to a few users, or even a single user, that may be most emotionally helpful. A known friend, for example, may better lift the user's spirits than a total stranger. The pool 78 of users, then, may be filtered for existing social friends associated with the user. That is, the user's personal social network 92 of friends may first be queried for the contrary mood 72. The social server 38 retrieves the user's personal social network 92 of friends and queries for the contrary mood 72. The social server 38 responds with existing friends who currently have the contrary mood 72. Exemplary embodiments may then pair the user with the existing friends who have the contrary mood 72. Exemplary embodiments may even select one of the existing friends, based on frequency of contact. That is, the social friends having the contrary mood 72 may be ranked according to the number or frequency of social interactions (posts and/or messages). Good friends, in other words, may better lift the user's spirits.

The pairings 90 may also be selected by geographic location 94. Once the pool 78 of users is determined, the pool 78 of users may be filtered based on the location 94. Exemplary embodiments may obtain the current location 94 of the communications device 22 associated with the distressed user. The user's communications device 22, for example, may report its current location 94 using global positioning system coordinates. The pool 78 of users may then be filtered for some radius about the user's current location 94. The pool 78 of users may thus be reduced to those within the current location 94 of the distressed user. If the user's personal social network 92 of friends is used, the user's friends may be filtered for the user's current location 94. The social server 38 may thus respond with users and/or existing friends who currently have the same location 94 as the user. Exemplary embodiments may then recommend social interactions with those users and/or existing friends nearest the distressed user.

Figure 5:
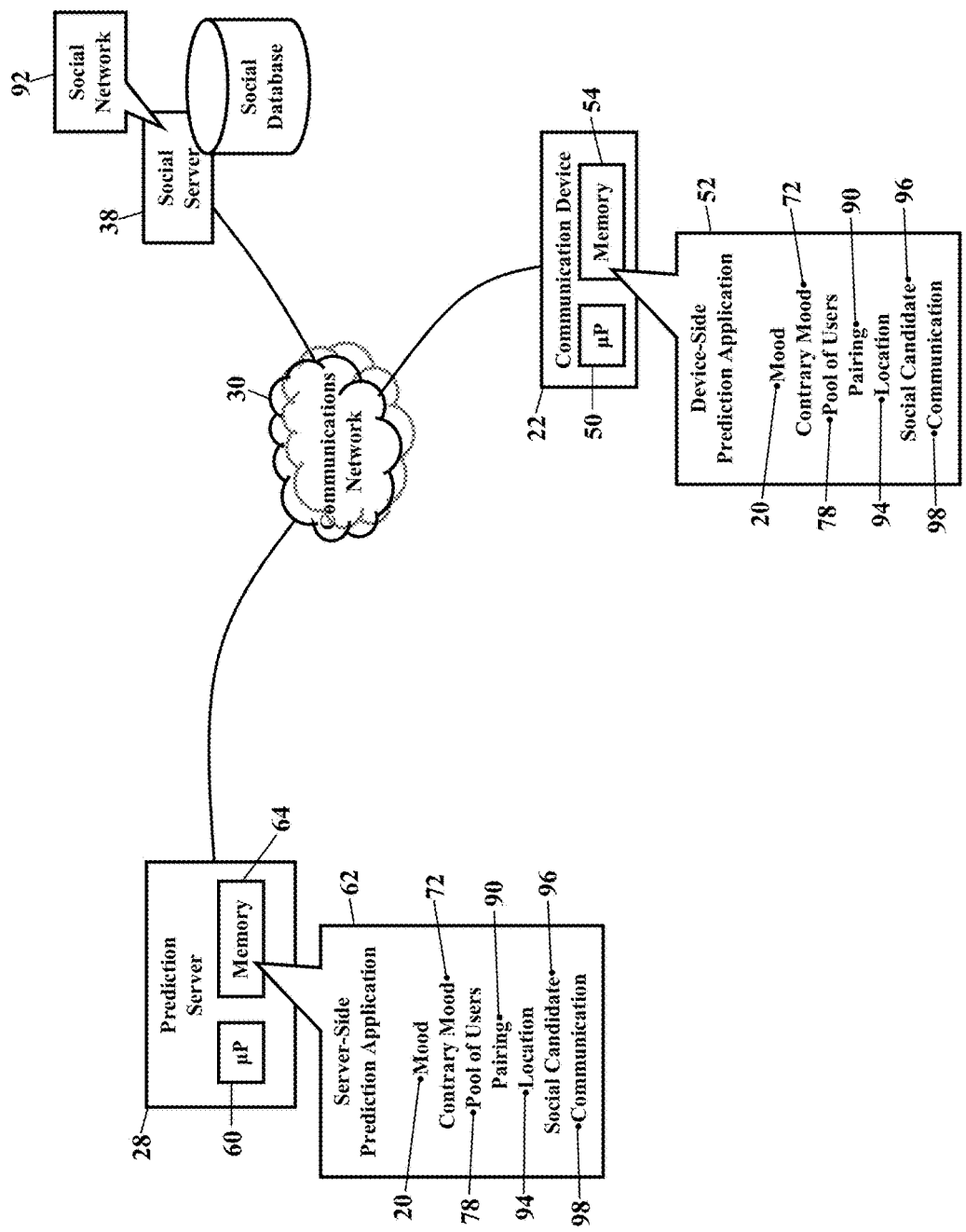
FIG. 5 is a schematic illustrating automatic social interactions, according to exemplary embodiments.

FIG. 5 is a schematic illustrating automatic social interactions, according to exemplary embodiments. Once the users and/or existing friends are determined (perhaps based on the location 94), exemplary embodiments may automatically recommend a social interaction, and even set-up a communication, to uplift the user's spirits. Exemplary embodiments, for example, may automatically select one of the users from the pool 78 of users having the contrary mood 72. Exemplary embodiments may automatically select one of the user's friends (from the user's personal social network 92 of friends) that has the contrary mood 72. Once a single social candidate 96 is determined, a communication 98 may be automatically sent to an address of the social candidate 96. A text message, for example, may be sent requesting personal interaction. A phone call may be automatically established to the telephone number of the social candidate 96. A social post may be made as a plea for emotional assistance. Exemplary embodiments, in other words, may reach out for emotional help by automatically establishing the communication 98 with the social candidate 96.

Figure 6:
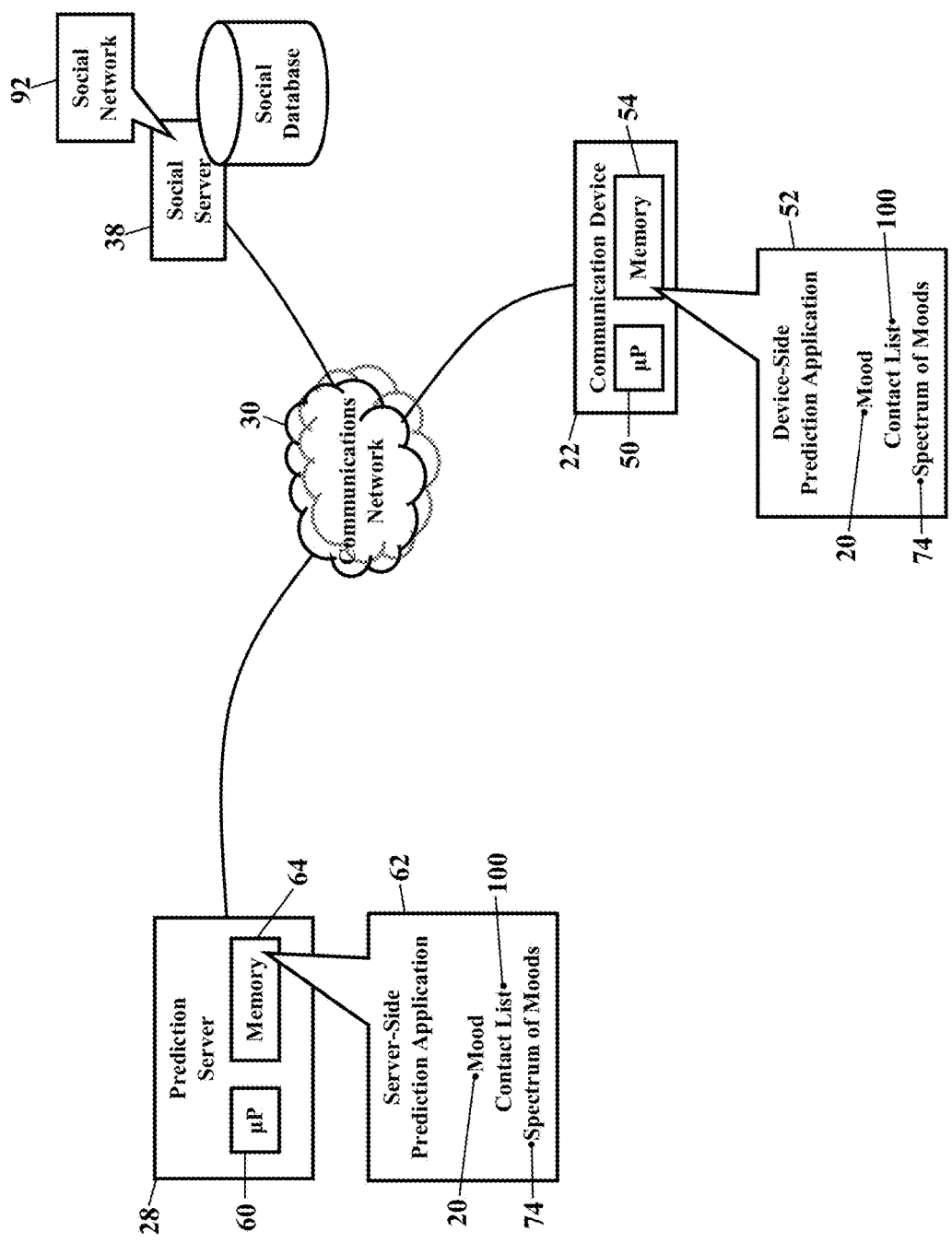
FIG. 6 is a schematic illustrating mood-based notifications, according to exemplary embodiments.

FIG. 6 is a schematic illustrating mood-based notifications, according to exemplary embodiments. Here exemplary embodiments may notify loved ones, friends, and even authorities of the user's predicted mood 20. When the user's mood 20 is predicted, the user's mood 20 may be compared to a contact list 100. The contact list 100 stores names and/or addresses that are contacted for each particular mood 20. "Mom" or "Mary" may be called or texted when the user's spirits are high or low on the spectrum 74 of moods. The contact list 100 may be especially defined for certain moods indicating emotional concern, such as "suicidal," riotous," or "murderous." Once the user's mood 20 is predicted, the contact list 100 may be queried. The contact list 100 responds with names and/or addresses associated with the user's mood 20. Exemplary embodiments may then make calls, send emails and/or text messages, and post to social networks based on the user's mood 20. Police, medical personnel, and even therapists may be alerted to emotional or behavioral candidates.

Figure 7:
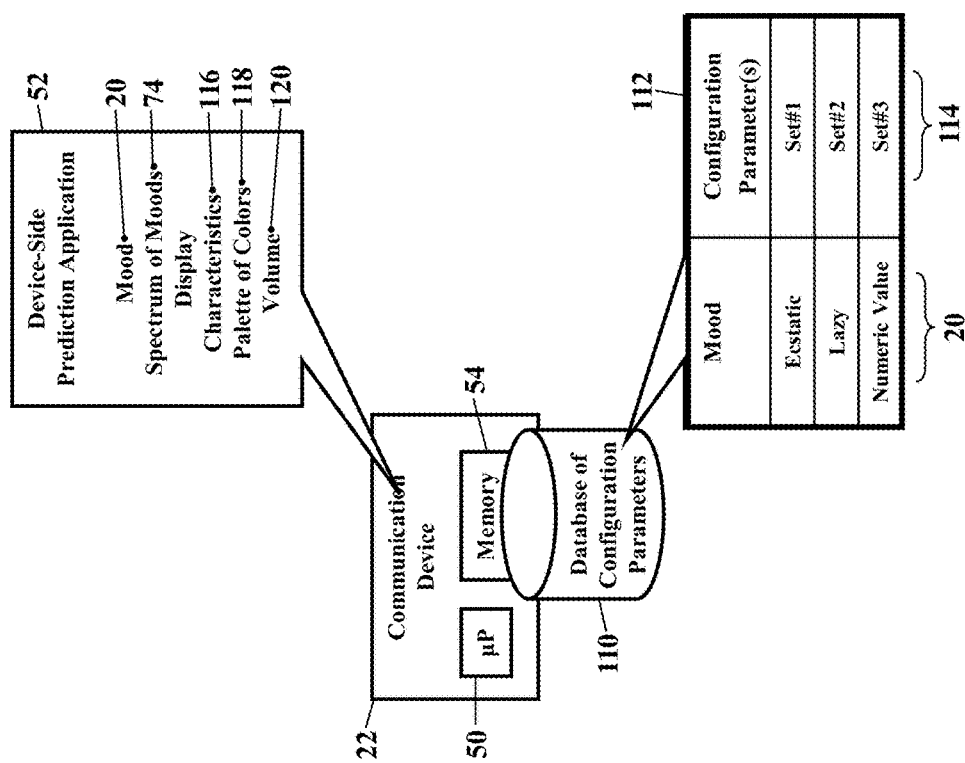
FIGS. 7-10 are schematics illustrating mood-based configuration, according to exemplary embodiments.

FIGS. 7-10 are schematics illustrating mood-based configuration, according to exemplary embodiments. Here the user's communications device 22 may be configured based on the user's predicted mood 20. The user's communications device 22 stores a database 110 of configuration parameters. FIG. 7, for simplicity, illustrates the database 110 of configuration parameters as a table 112 that maps, relates, or associates different configuration parameters 114 to different moods 20. Once the user's mood 20 is predicted, the device-side prediction application 52 queries the database 110 of configuration parameters for the mood 20. The device-side prediction application 52 receives the corresponding configuration parameters 114 in response. The device-side prediction application 52 then instructs the processor 50 to automatically implement the configuration parameters 114. The user's communications device 22 thus self-configures itself to the user's mood 20. Display characteristics 116, for example, may be changed to suit the user's mood 20. A palette 118 of colors, for example, may be reduced when the mood 20 is low on the spectrum 74 of moods, while the palette 118 of colors may be increased when the mood 20 is high. Similarly, the volume 120 of speakers may be reduced to when the mood 20 is low on the spectrum 74 of moods, while the volume 120 of speakers may be increased when the mood 20 is high. Other parameters 114 may adjust a processing speed of the processor 50, allocate the memory 54 based on the mood 20, or adjust any other configurable parameter.

Figure 8:
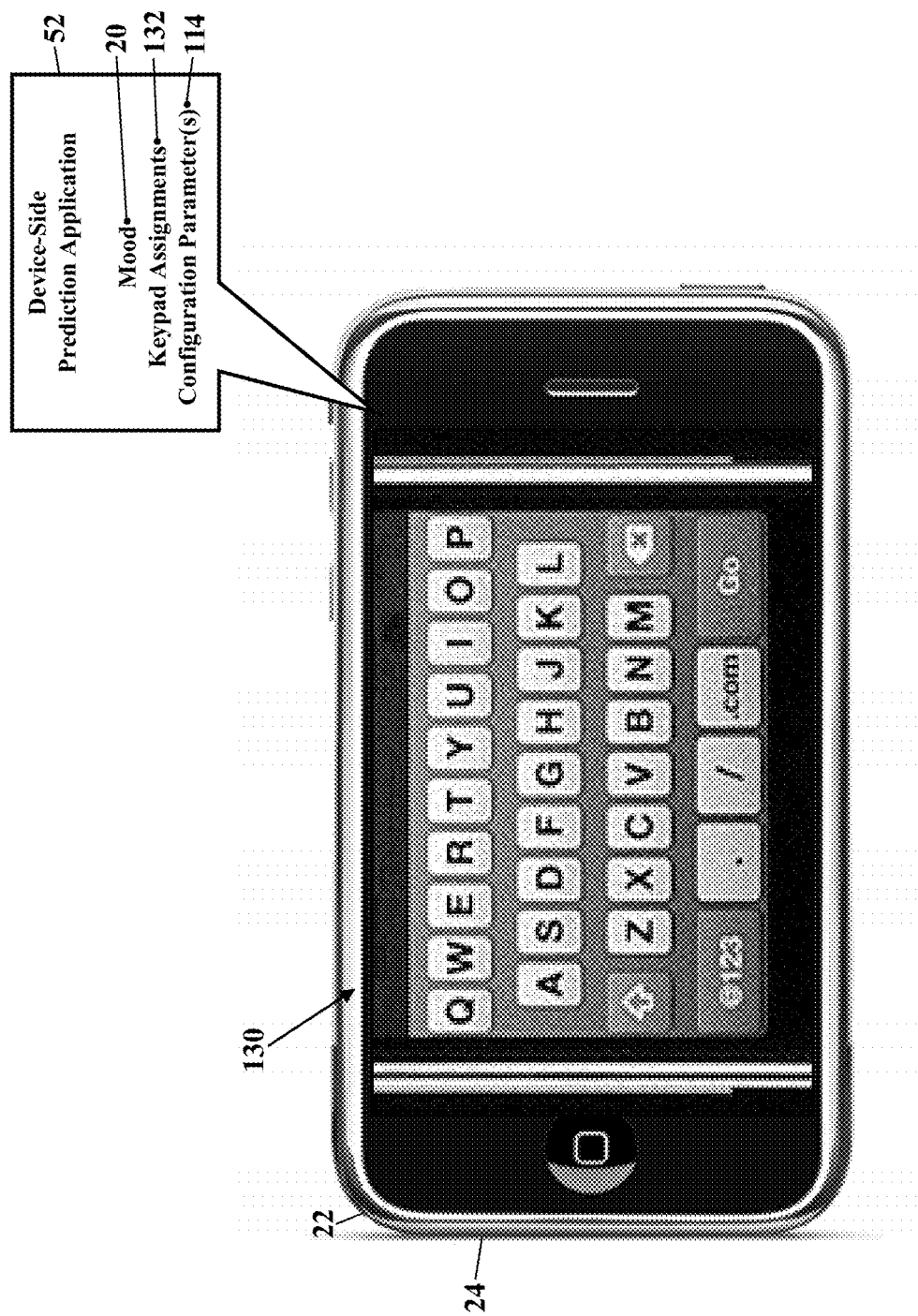
Figure 9:
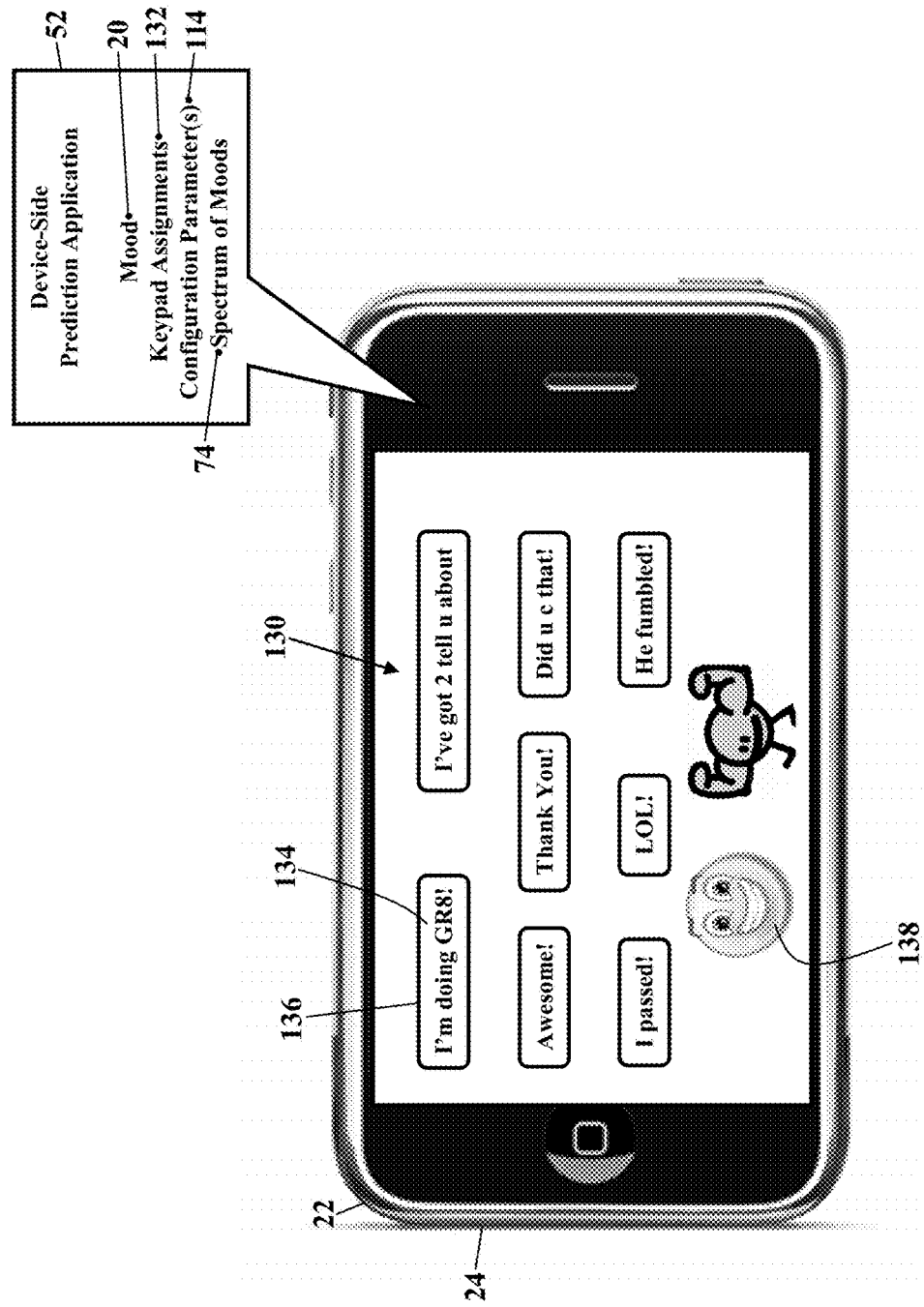
Figure 10:
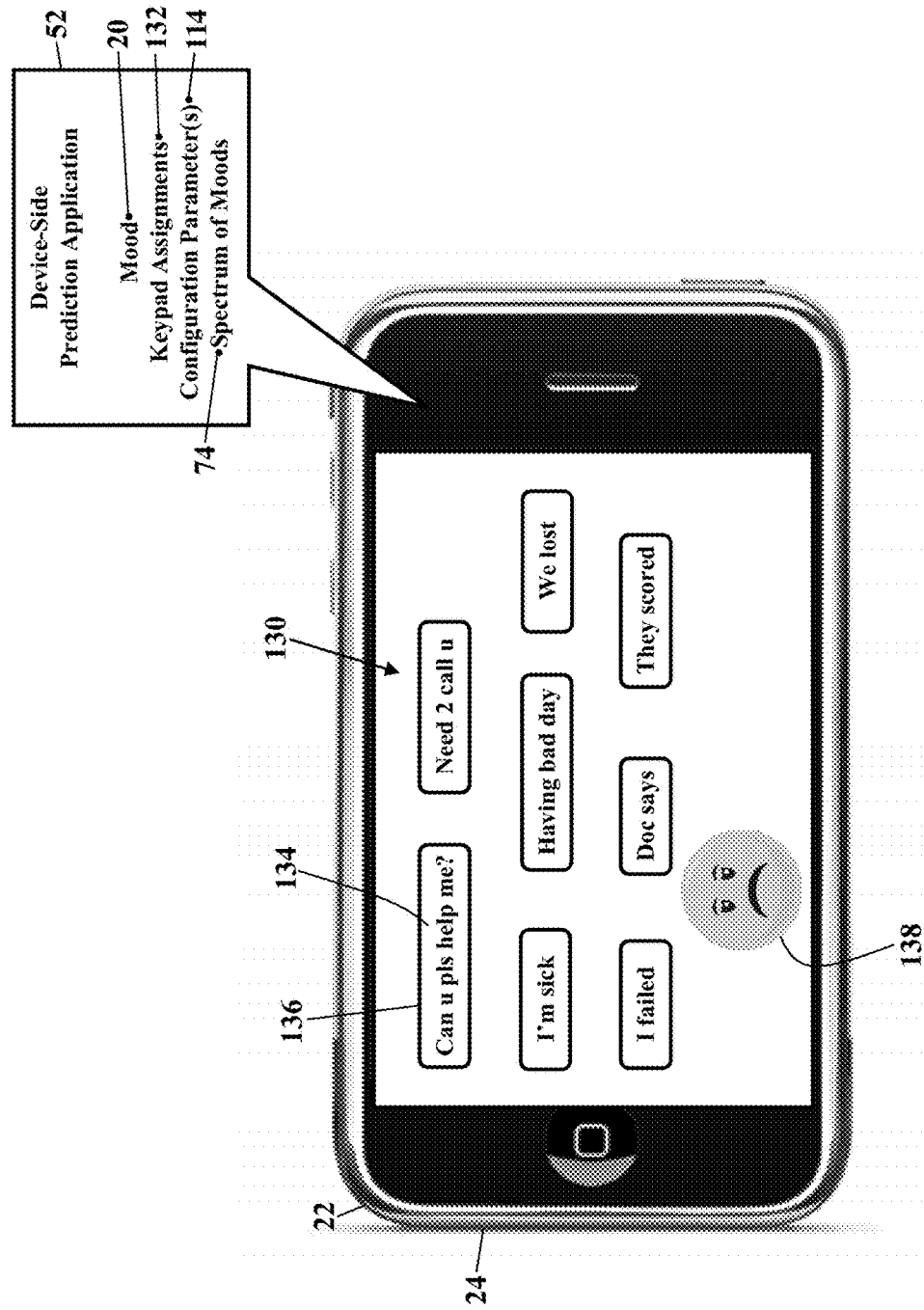

FIGS. 8-10 further illustrate automatic configuration of the user's communications device 22. FIG. 8, for example, illustrates an electronic keypad 130 on the user's smart phone 24. The keypad 130 and the smart phone 24 are illustrated in an enlarged view for clarity of features. Once the user's mood 20 is predicted, the configuration parameters 114 may specify different keypad assignments 132, depending on the user's mood 20. The configuration of the keypad 130 may thus be changed, according to the user's mood 20.

FIG. 9, for example, illustrates one of the mood-based keypad assignments 132. Here the electronic keypad 130 is configured for when the mood 20 is high on the spectrum 74 of moods. The user's mood 20, in other words, may be associated to different, predetermined phrases 134 that are assigned to keys 136 in the keypad 130. The configuration of the keypad 130 may thus be changed, according to the user's mood 20. As FIG. 9 illustrates, when the user's mood 20 is "happy," the electronic keypad 130 may be configured to display phrases associated with the "happy" mood 20. One of the electronic keys 136, for example, may be configured for the phrase "I'm doing GREAT!" The user need only touch or depress the corresponding key 136 for the text "I'm doing GREAT!" Mood-matching icons 138 may also be assigned. FIG. 10, on the other hand, illustrates a different configuration of the keypad 130 for lower moods on the spectrum 74 of moods. Different keys in the keypad 130 may thus be associated with different textual phrases 134, according to the user's predicted mood 20. Once the user's mood 20 is predicted, exemplary embodiments may retrieve the keypad assignments 132 associated with the user's mood 20. The processor 50 may then automatically implement the keypad assignments 132, thus assigning the predetermined phrases 134 to the keys 136 in the keypad 130.

Figure 11:
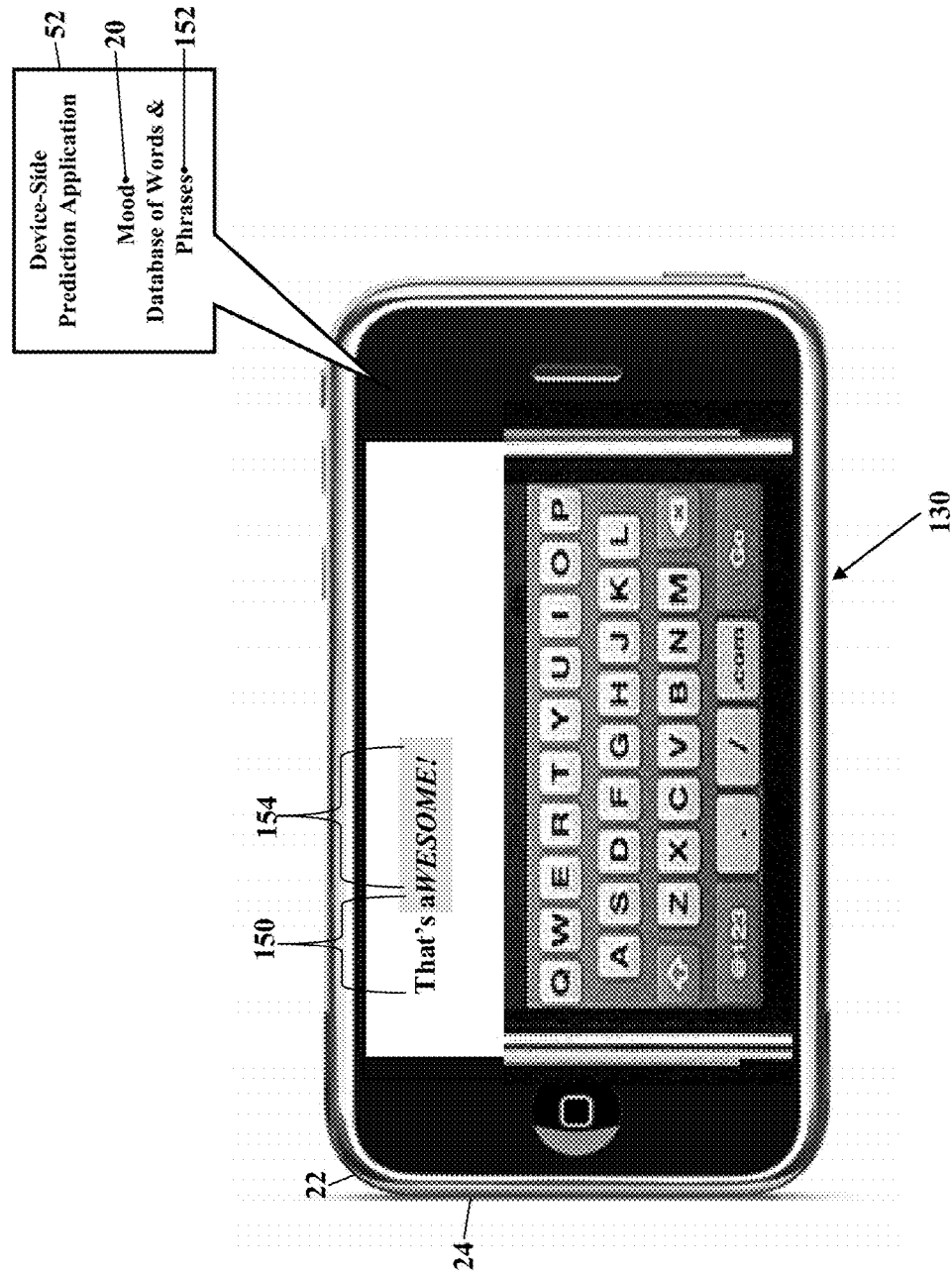
FIG. 11 is a schematic illustrating mood-based autosuggestion, according to exemplary embodiments.

FIG. 11 is a schematic illustrating mood-based auto-suggestion, according to exemplary embodiments. As the user types text 150 on the keypad 130, exemplary embodiments may suggest words and phrases matching the user's mood 20. The device-side prediction application 52, for example, may query a database 152 of words and phrases. Here the database 152 of words and phrases may store emotional text 154 associated with the user's mood 20. As the user types, the device-side prediction application 52 instructs the processor (illustrated as reference numeral 50 in FIGS. 2-7) to query the database 152 of words and phrases for the successive letters typed by the user. The database 152 of words and phrases responds with the emotional text 154 matching the successive letters. The database 152 of words and phrases may thus be populated with textual expressions related to the user's mood 20. If the user's mood 20 is "thrilled" or "excited," the database 152 of words and phrases may contain "AWESOME!" or "KILLER!" The user need only input "a" or "k" to be presented with matching textual phrases associated with the corresponding mood 20. The user's mood 20 may thus be used to filter the database 152 of words and phrases and to reduce the number of possible matching textual entries. The user's mood 20, in other words, reduces the possible matches for textual suggestions.

Figure 12:
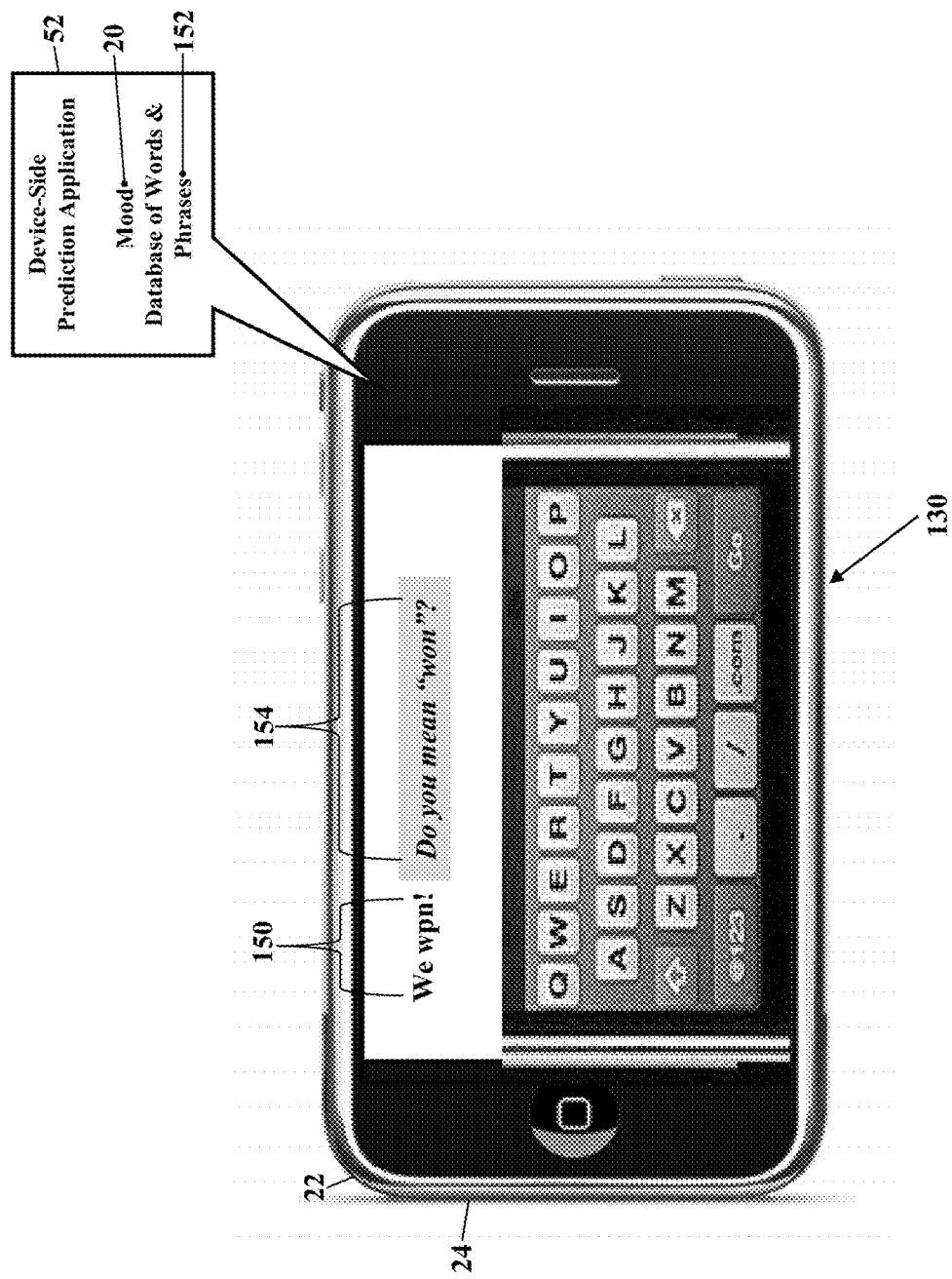
FIG. 12 is a schematic illustrating mood-based autocorrection, according to exemplary embodiments.

FIG. 12 is a schematic illustrating mood-based auto-correction, according to exemplary embodiments. Here the user's mood 20 may be used to correct typing mistakes. As the user types the text 150 on the keypad 130, the device-side prediction application 52 may instruct the processor (illustrated as reference numeral 50 in FIGS. 2-7) to spell-check the text 150. The processor 50 may query the database 152 of words and phrases to determine if words are correctly spelled. Here, though, the database 152 of words and phrases may be filtered according to the user's mood 20. The database 152 of words and phrases store words and phrases associated with the user's mood 20. Once the user's mood 20 is known, the database 152 of words and phrases may be filtered for those words and phrases associated with the user's mood 20. Again, then, the user's mood 20 may be used to reduce the number of possible matching textual entries. The user's mood 20, in other words, reduces the possible matches for auto-correction of misspelled words and phrases.

Figure 13:
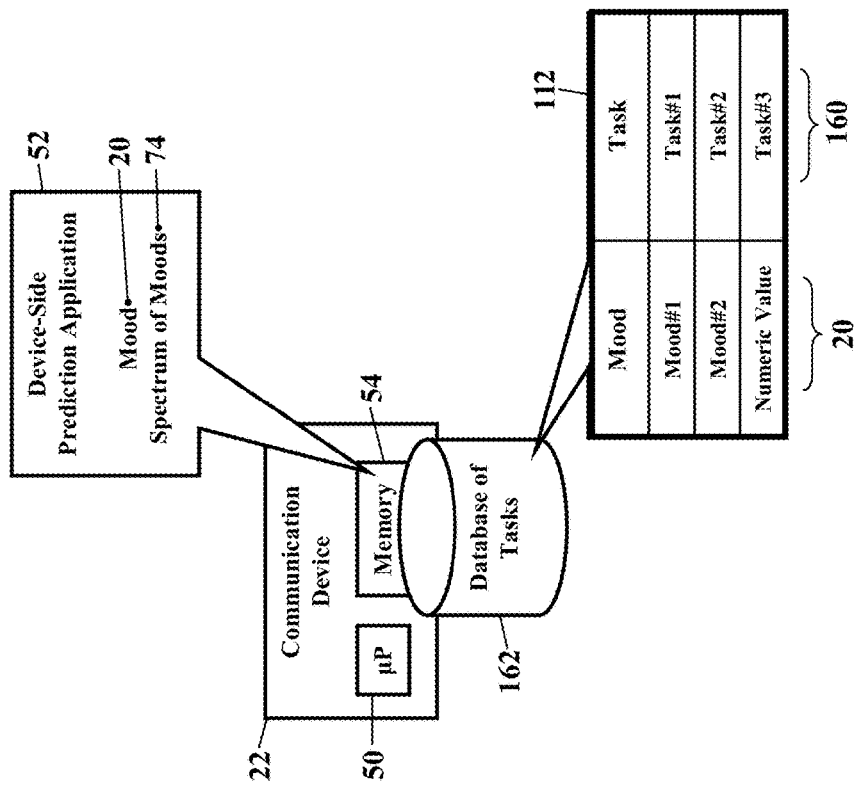
FIG. 13 is a schematic illustrating mood-based tasks, according to exemplary embodiments.

FIG. 13 is a schematic illustrating mood-based tasks, according to exemplary embodiments. Once the user's mood 20 is predicted, the device-side prediction application 52 may execute one or more tasks 160 based on the user's mood 20. Here a database 162 of tasks may be queried for the task 160 associated with the user's mood 20. The database 162 of tasks is again illustrated as the table 112 that maps, relates, or associates different tasks 160 to different moods 20. Once the user's mood 20 is predicted, the device-side prediction application 52 queries the database 162 of tasks for the mood 20. The device-side prediction application 52 receives the corresponding task 160 in response. The device-side prediction application 52 then instructs the processor 50 to automatically execute the task 160. The task 160, for example, may cause the processor 50 to activate a display device to display some message or image, such as "cheer up" or "great job!" The task 160 may instruct the processor 50 to play some audio file, such as "Gonna Fly Now" (otherwise known as the "Theme from Rocky") when spirits are high on the spectrum 74 of moods.

Figure 14:
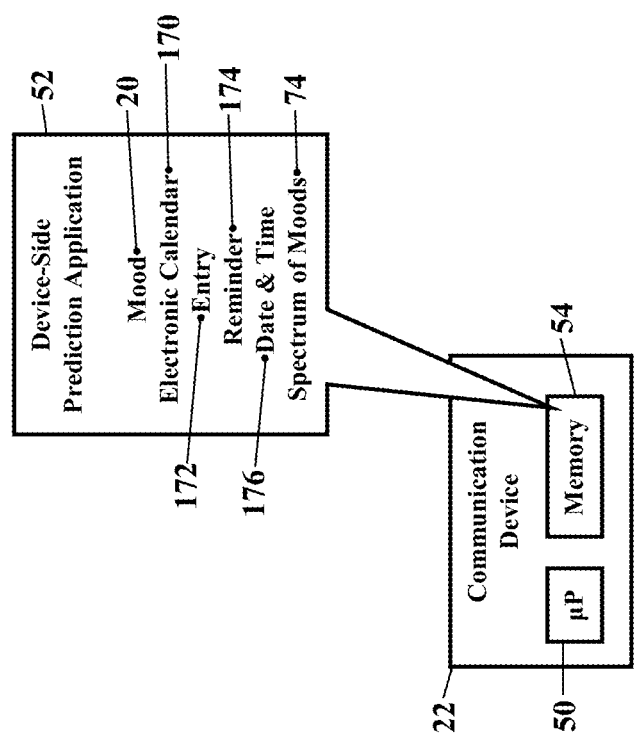
FIGS. 14-15 are schematics illustrating mood-based calendaring, according to exemplary embodiments.
Figure 15:
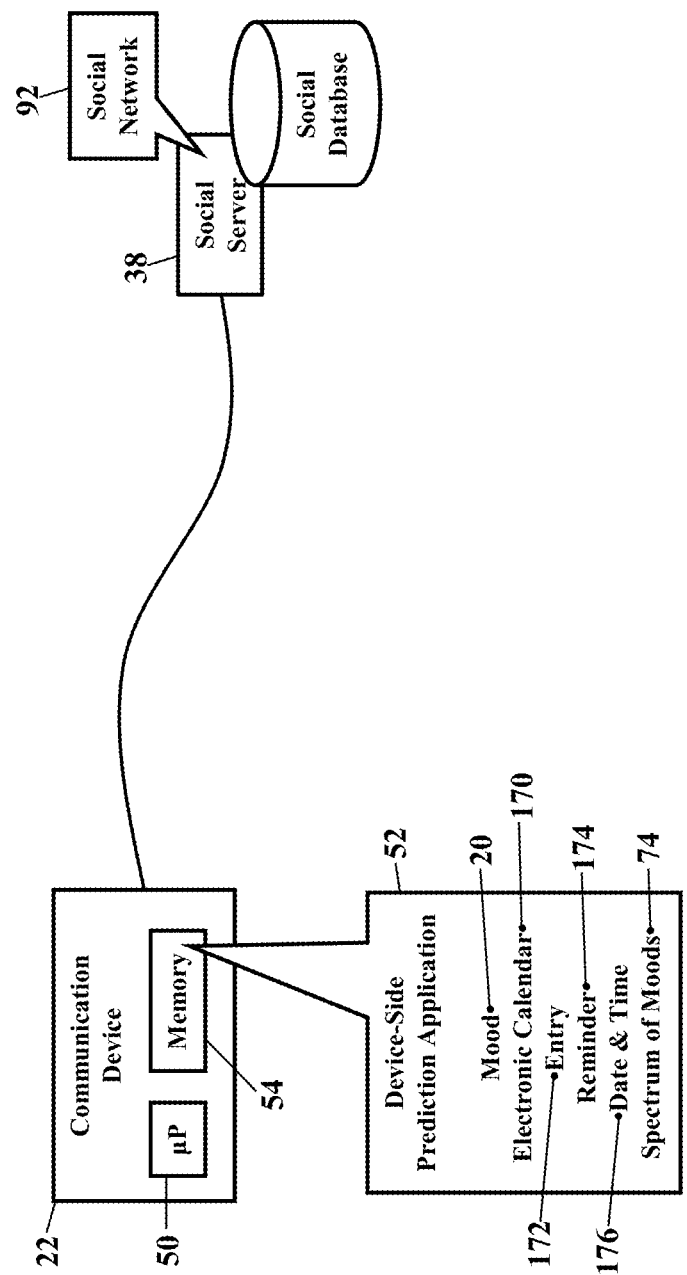

FIGS. 14-15 are schematics illustrating mood-based calendaring, according to exemplary embodiments. Here the user's mood 20 may be used to schedule tasks and appointments in the user's electronic calendar 170. The user's communications device 22 may store or access the user's electronic calendar 170. The electronic calendar 170 maintains one or more entries 172 for tasks and/or appointments. Each entry 172 may have a corresponding reminder 174. The entry 172 and the reminder 174 each have an associated date and time 176. Once the user's mood 20 is known, the entries 172 in the user's electronic calendar 170 may be shuffled or rearranged according to the mood 20. Each entry 172 may be associated with a particular mood 20 in the spectrum 74 of moods. Some entries 172, then, may be moved "up" to an earlier date and time 176, especially when the user's mood 20 is higher in the spectrum 74 of moods. Some entries 172, though, may move down to a later date and time 176 when the user's mood 20 is lower in the spectrum 74 of moods. The user, for example, may schedule some entry 172 to request a pay raise. When the user's mood 20 is high on the spectrum 74 of moods, the entry 172 and/or the corresponding reminder 174 may advance to the current date and time 176. If the user's mood 20 is low, though, the entry 172 and/or the corresponding reminder 174 may be postponed to a later date and time 176. Exemplary embodiments may thus automatically promote and demote the entries 172 based on moods.

FIG. 15 further illustrates mood-based calendaring. Here the entries 172 may be sorted according to the mood 20 of another person. As earlier paragraphs explained, the user's communications device 22 may receive the published moods of other people. That is, the social server 38 may publish the moods 20 of the user's social network 92 of family members, friends, and coworkers. Once the moods of the user's social network 92 are known, the user's electronic calendar 170 may be sorted according to friends' moods. The entry 172 may be associated with one or more members of the user's social network 92. If the user's supervisor is in a "good" mood, for example, the user may want to request a pay raise. The user's corresponding calendar entry 172, then, may advance to the current date and time 176 to capture the supervisor's "good" mood. Conversely, if the supervisor's mood 20 is low, the entry 172 may be postponed to a later date and time 176. Exemplary embodiments may thus automatically promote and demote entries 172 based on the moods 20 of the user's social network 92.

Figure 16:
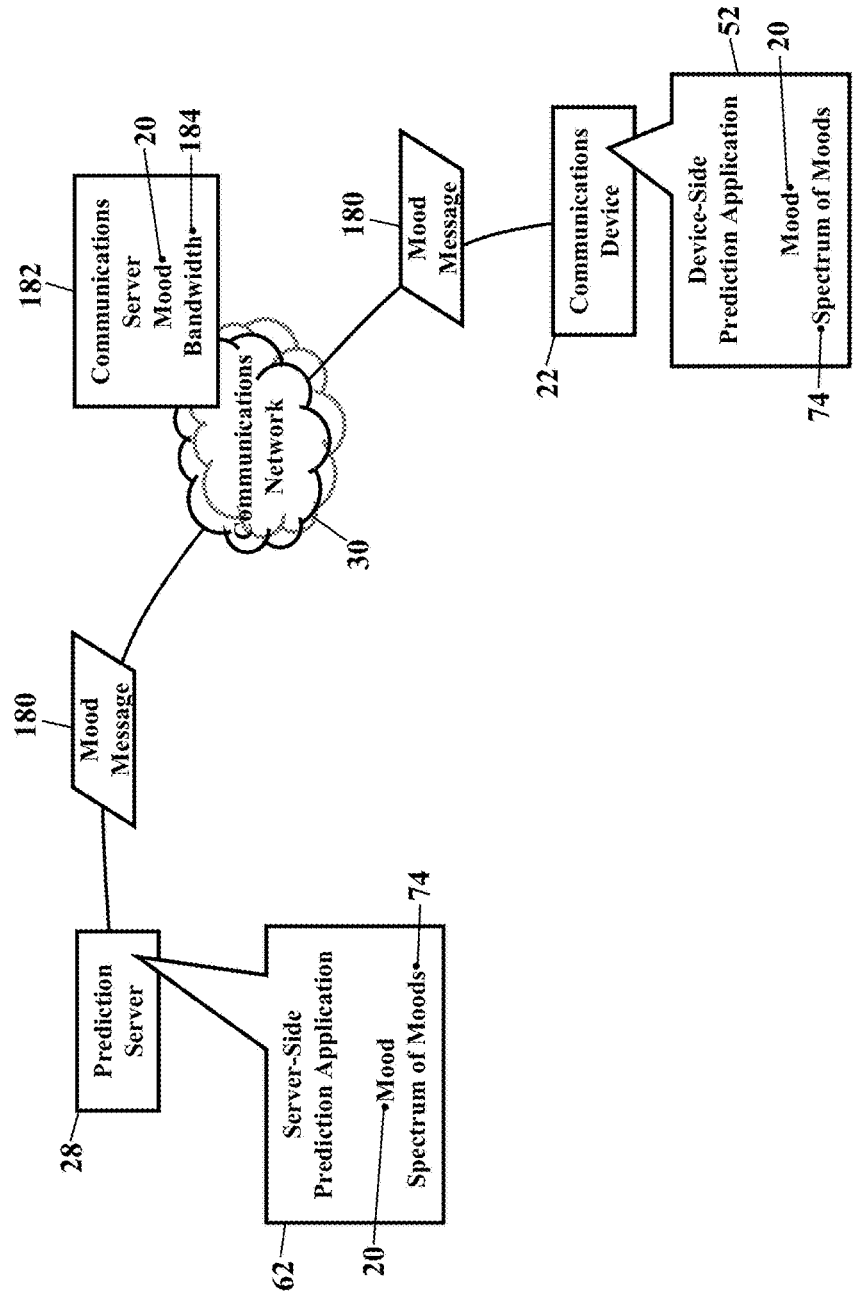
FIGS. 16-17 are schematics illustrating mood-based provisioning, according to exemplary embodiments.

FIG. 16 is a schematic illustrating mood-based provisioning, according to exemplary embodiments. Here the communications network 30 may self-configure or provision based on the mood 20 of the user. Once the user's mood 20 is predicted, the user's mood 20 may be used to infer usage of the user's communications device 22. If the user's mood 20 is high on the spectrum 74 of moods, for example, the user may be predicted to capture more digital photos and videos. Excited people, in other words, are more apt to document their exciting moments. If the user's mood 20 is low on the spectrum 74 of moods, the user is not expected to document moments of despair. So, once the user's mood 20 is predicted, the user's mood 20 may be communicated to intelligence within the communications network 30. FIG. 16, for example, illustrates the user's mood 20 being sent in a mood message 180. The mood message 180 may be sent from the user's communications device 22 and/or the prediction server 28. Regardless, the mood message 180 routes along the communications network 30 to a network address associated with a communications server 182. The communications server 182 inspects the mood message 180 to obtain the user's mood 20. Once the user's mood 20 is retrieved, the communications server 182 may configure one or more network elements within the communications network 30 according to the mood 20.

Bandwidth 184, for example, may be inferred from the user's mood 20. As the above paragraph explained, when the user's mood 20 is high on the spectrum 74 of moods, the user can be expected to document emotional highs. The communications server 182, then, may instruct network elements within the communications network 30 to allocate more bandwidth 184 to the user's communications device 22. Conversely, if the user's mood 20 is low on the spectrum 74 of moods, the user is not expected to document moments of despair. Bandwidth 184, then, may be reduced to the user's communications device 22. The bandwidth 184, in other words, may be dynamically allocated according to the user's mood 20. Network resources may thus be conserved, or deployed, based on the moods of customers.

Figure 17:
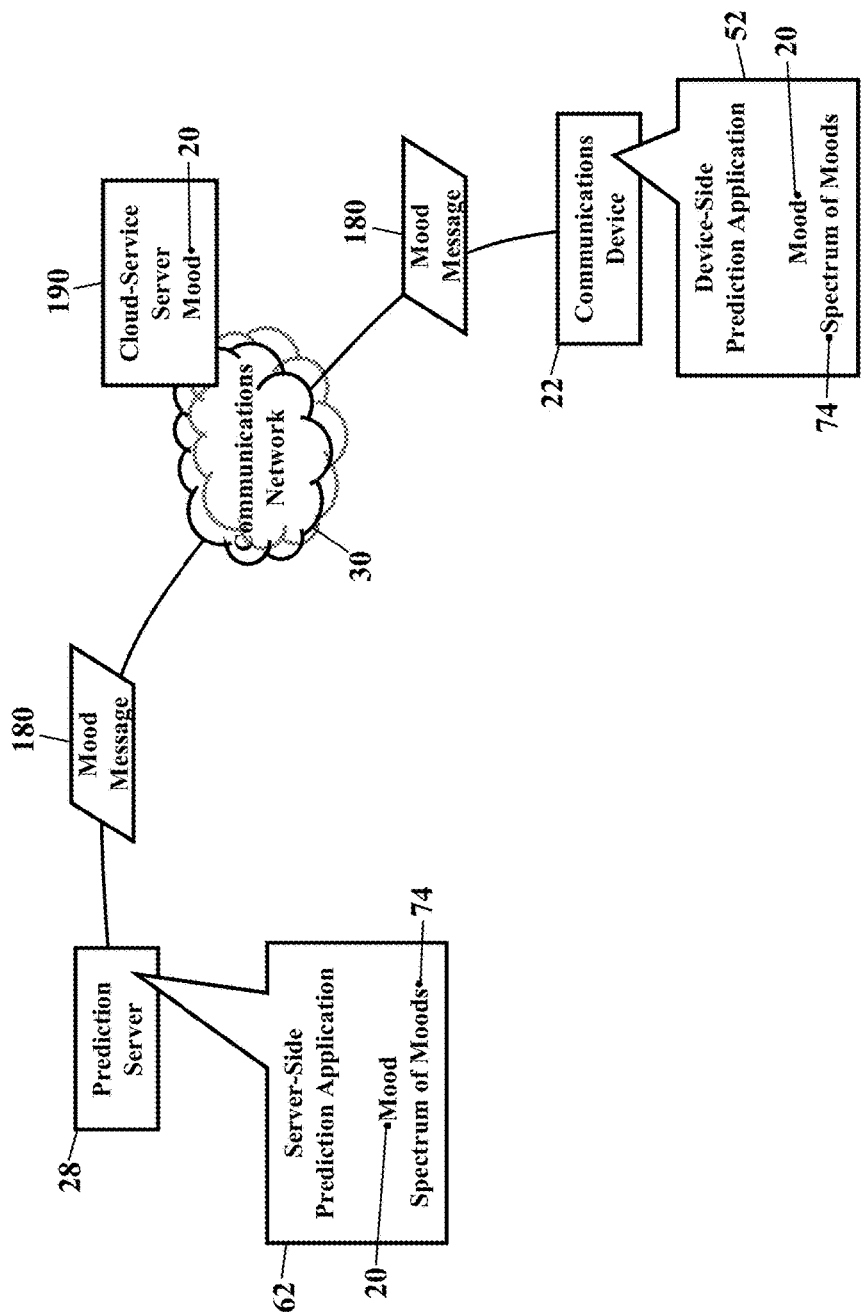

FIG. 17 is another schematic illustrating mood-based provisioning, according to exemplary embodiments. Here the user's mood 20 may be conveyed to cloud-based services. Again, once the user's mood 20 is predicted, the mood message 180 may be sent for mood-based provisioning. Here the mood message 180 routes along the communications network 30 to a network address associated with a cloud service server 190. The cloud service server 190, for example, may represent an online storage service or a photo or video processing service (such as SHUTTERFLY®). The mood message 180 may be used to alert the cloud service server 190 to expect, and provision for, mood-related activity. Again, if the user's mood 20 is high on the spectrum 74 of moods, the user may be predicted to capture more digital photos and videos. The mood message 180 may thus alert the user's online storage service to expect, and allocate memory to, the images and videos from the user's communications device 22. Similarly, the user's online photo processing service may be alerted to expect orders for photo processing. If the user's mood 20 is low, though, the user is not expected to document moments of despair. The cloud service server 190 may thus concentrate resources and marketing efforts to other users.

Figure 18:
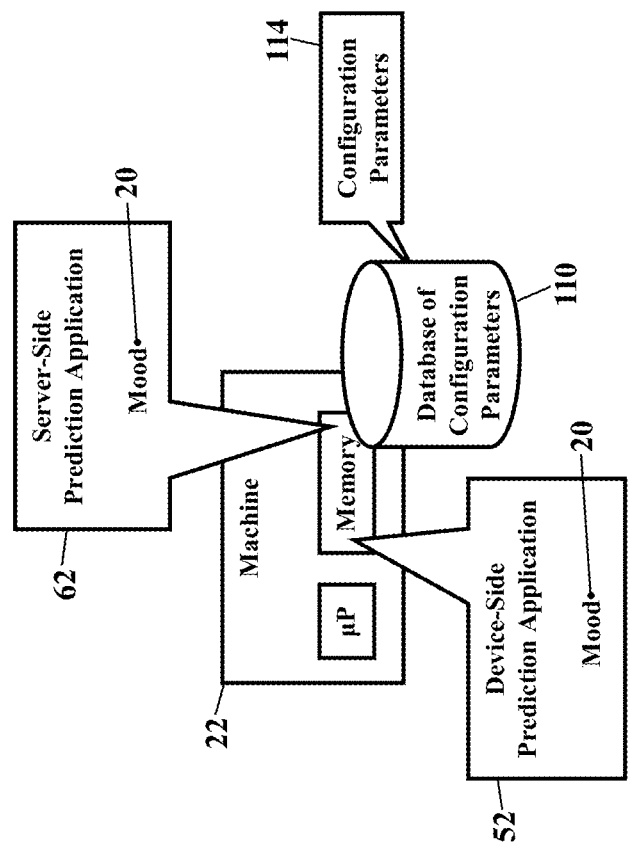
FIG. 18 is another schematic illustrating mood-based configuration of machinery, according to exemplary embodiments.

FIG. 18 is another schematic illustrating mood-based configuration of machinery, according to exemplary embodiments. Earlier paragraphs explained that the user's communications device (illustrated as reference numeral 22 in FIGS. 1-17) may be configured, based on the user's predicted mood 20. FIG. 18 extends mood-based configuration to any machine or apparatus. That is, the device-side prediction application 52, and/or the server-side prediction application 62, may be executed by any machine 200. The machine 200 thus generically represents any equipment, manufacture, or apparatus that may be configured based on the mood 20. The user's car, for example, may automatically configure itself, based on the user's mood 20. If the user's mood 20 is high on the spectrum 74 of moods, the user may be predicted to drive with excessive speed or abrupt maneuvers. A controller in the car, then, may limit engine performance to reduce vehicle speeds. Electronically-adjustable suspension components (such as shock absorbers, mounts, and sway bars) may also adjust their responsiveness to ensure safety of the user in times of euphoria. Emotional lows, likewise, may prevent excessive speed or maneuvers to reduce chances of intentional or accidental injury.

Any machinery may execute mood-based configuration. Metal presses may slow down when the operator's mood 20 is "groggy." Injecting molding presses may change cycle times in response to the operator's mood 20. Whatever the machinery, the operator's mood 20 may determine the machinery's configuration parameters 114. FIG. 18 thus illustrates a generic machine 200. The machine 200 stores the database 110 of configuration parameters in memory. Once the operator's mood 20 is predicted, a processor in the machine 200 queries the database 110 of configuration parameters for the operator's mood 20. The processor retrieves the corresponding configuration parameters 114 in response. The processor then automatically implements the configuration parameters 114, thus self-configuring the machine 200 to the user's mood 20.

Figure 19:
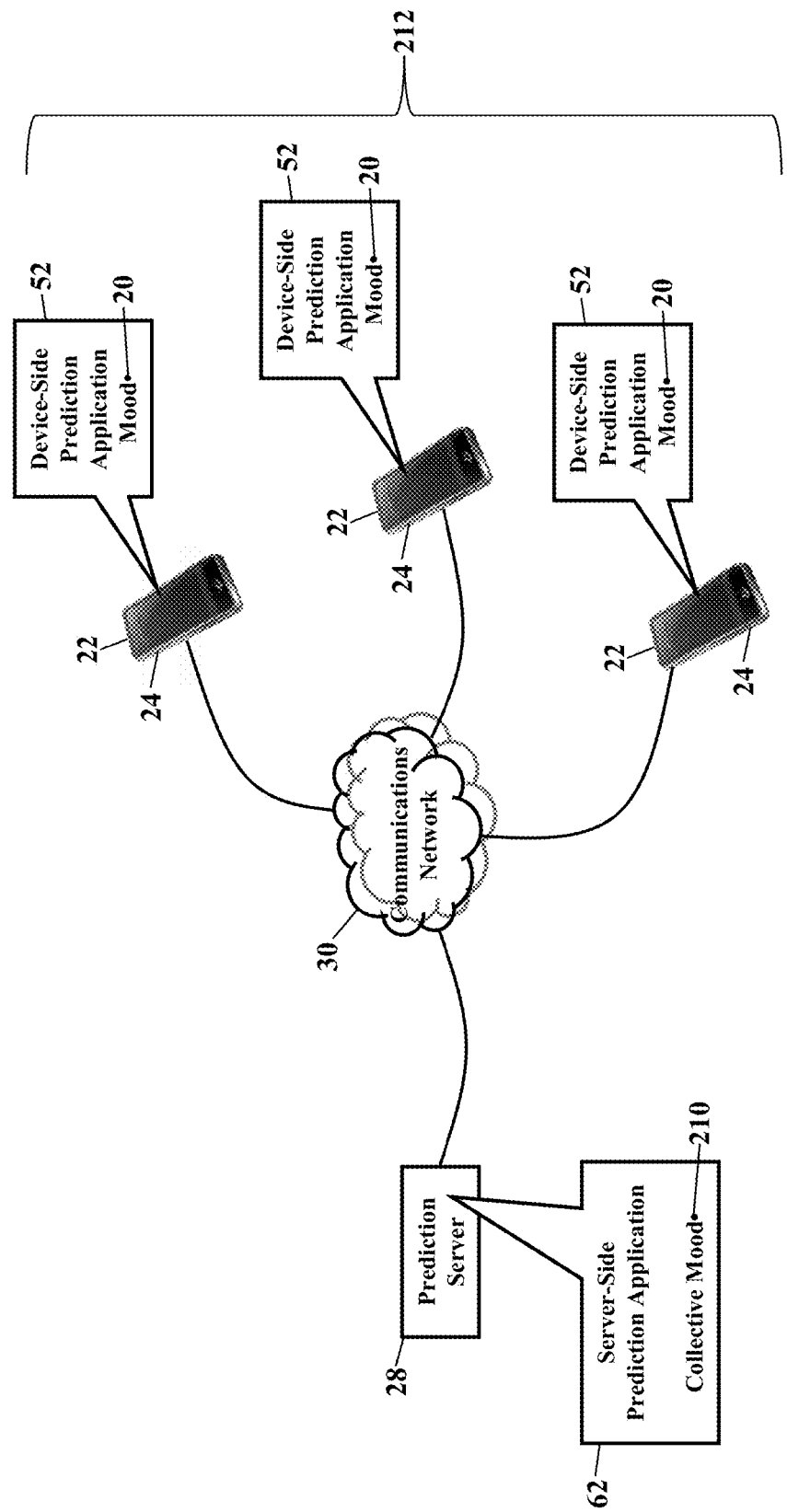
FIG. 19 is a schematic illustrating collective moods of groups, according to exemplary embodiments.

FIG. 19 is a schematic illustrating collective moods of groups, according to exemplary embodiments. Exemplary embodiments may be applied to determine a collective mood 210 of a group 212 of users. As FIG. 19 illustrates, multiple user communications devices 22 may individually execute the device-side prediction application 52. Each user's smart phone 24 may thus self-report, or cooperate to report, its individual mood 20. The prediction server 28 may then group together the multiple user communications devices 22 for prediction of an overall, collective mood 210. The multiple user communications devices 22 may have some shared trait or characteristic, such as current location, social network (e.g., existing friends), affiliation (e.g., work, school, sports team), or demographic. However the group 212 of users is determined, the collective mood 210 of the group 212 of users may also be determined. There are many different calculations that may determine the collective mood 210. The collective mood 210, for example, may be an average value of all individual moods. This disclosure, then, need not explain the many different methods of determining the collective mood 210. However, once the collective mood 210 is determined, the collective mood 210 may be analyzed and used.

Figure 20:
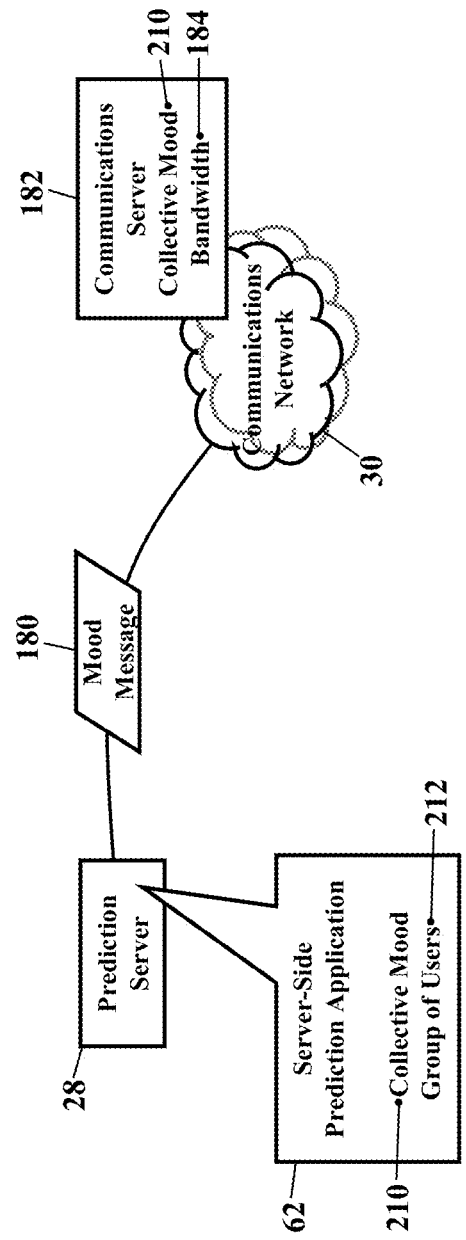
FIG. 20 is another schematic illustrating mood-based provisioning, according to exemplary embodiments.

FIG. 20 is another schematic illustrating mood-based provisioning, according to exemplary embodiments. Here the collective mood 210 may be used to self-configure the communications network 30. As earlier paragraphs explained, the individual user's mood 20 may be used to configure the services provided to the user's communications device 22. Individual mood-based provisioning, however, may be too microscopic for efficient provisioning. Individual mood-based provisioning, in other words, may be too expensive for wide-spread deployment.

Exemplary embodiments, then, may implement macroscopic mood-based provisioning. Here the collective mood 210 of the group 212 of users may be more efficiently and cheaply implemented for provisioning within the communications network 30. Once the collective mood 210 of the group 212 of users is determined, services to that group 212 of users may be provisioned.

Sporting events provide an example. Many sporting events may draw many thousands of people. Football, soccer, and baseball are common examples of popular events. Indeed, some college football games can draw over 100,000 attendees. Many of most of the attendees carry the communications device 22 (such as the smart phone 24 illustrated in FIG. 1). Individual, mood-based provisioning for each attendee would likely be too complicated and costly. The communications network 30, in other words, likely cannot dynamically provision the bandwidth 184 to each attendee. Macroscopic mood-based provisioning, however, may be more efficiently implemented for one or more groups 212 of users. Sections of users, for example, in a particular seating section may be grouped together and their collective mood 210 determined. Network equipment serving that seating section may then be configured according to the collective mood 210. Because there may be thousands of attendees, all in different sections of a stadium/arena, different sections may be macroscopically provisioned. Bandwidth 184 may thus be dynamically allocated based on the collective mood 210 of each seating section.

Another example is provided of dynamic, mood-based management of bandwidth 184. Certain events, like touch downs, home runs, goals, and other sporting events, may be modeled for increases in data traffic. Again, when favorite teams and players make great plays, people like to share pictures and videos. People also post to their social networks. People also query for data, such as player identities and stats. When an unknown player makes a great play, people often immediately query for the player's history, college team, and other stats. So the bandwidth 184 needs exhibit dynamic demands that may be managed. Similar mood-based management may be applied to music concerts, restaurants, bars, homes, and any other facility or location where groups gather. Changes in mood may thus be managed to allocate WI-FI® and cellular infrastructures to dynamically shift bandwidth to support estimated traffic usage.

Macroscopic mood-based provisioning, of course, may be based on many factors. Users may be grouped based on location. In the above example, groupings of attendees in different seating sections are really location-based grouping. Mood-based provisioning, however, may be applied to demographic groupings. Groups of users (or, more accurately, groups of user communications devices) may be logically clustered according to team affiliation, income, or other profile parameters. Fans of the winning team, for example, may be expected to take more images and videos, thus requiring more bandwidth 184. Users associated with higher income levels may be expected to capture more images and video, as they care less about costs. An "exciting" game, in other words, may require more bandwidth. A "boring" game, though, may require less bandwidth 184, as the attendees are expected to take less video.

Mood-based provisioning may also be applied to manufacturing environments. Assembly line machinery, for example, may be configured according to the collective mood 220 of operators and workers. A computer assembly line may be slowed, or sped up, according to the collective mood 220 of its workers. The pace of any industrial facility, in other words, may be adjusted, based on the collective mood 220 of its workers. Quality control personnel may be deployed according to the collective mood 220 of its workers. If the collective mood 220 is low, quality indicators (such as defects) may increase, so more quality control measures may be required. If the collective mood 220 is trending down, environmental conditions may be degrading. Air conditioning, for example, may be failing, causing the workers to grumble. Maintenance personnel may thus be deployed when the collective mood 220 falls. The collective mood 220, of course, may reflect all manner of conditions, from the quality of food in a cafeteria to reception of the boss's latest pronouncement.

Figure 21:
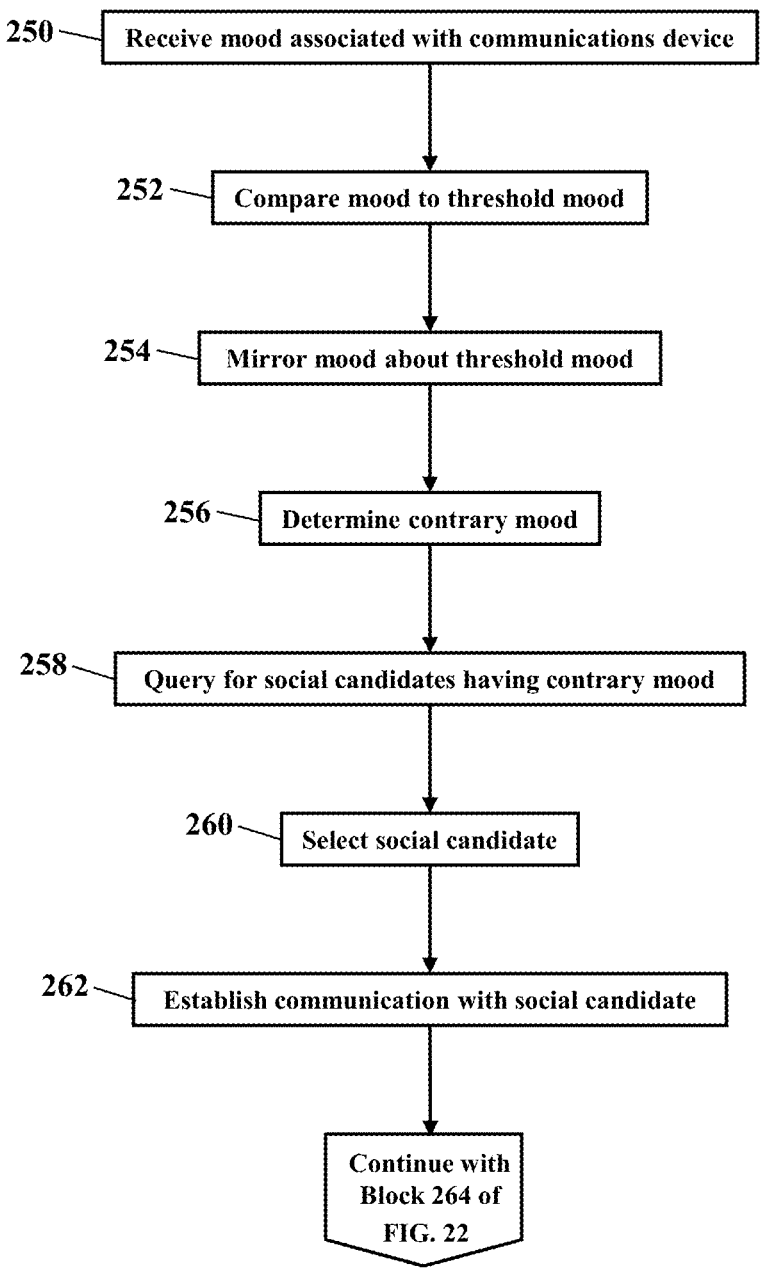
FIGS. 21-23 are flowcharts illustrating a method or algorithm for predicting mood, according to exemplary embodiments.
Figure 22:
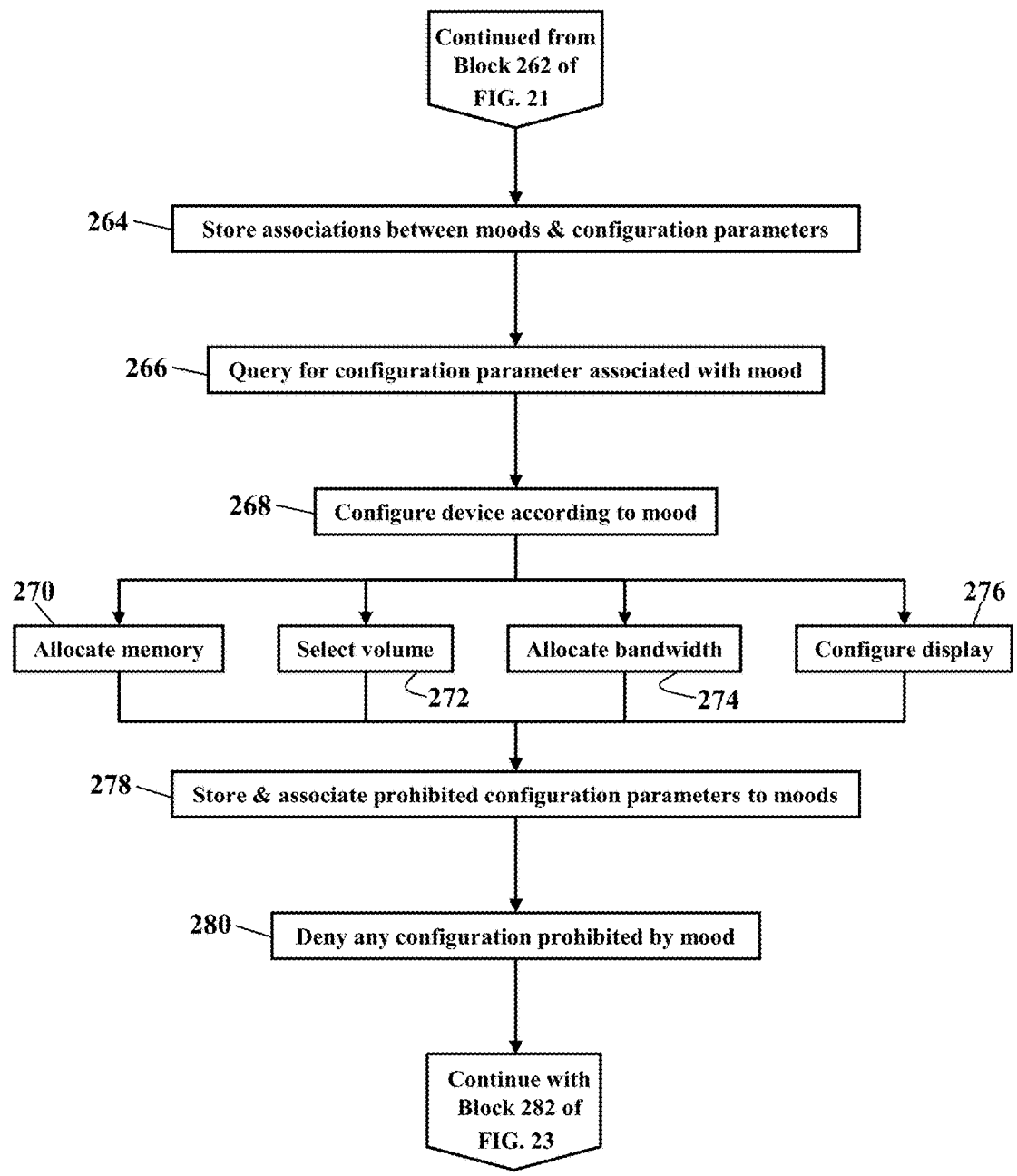
Figure 23:
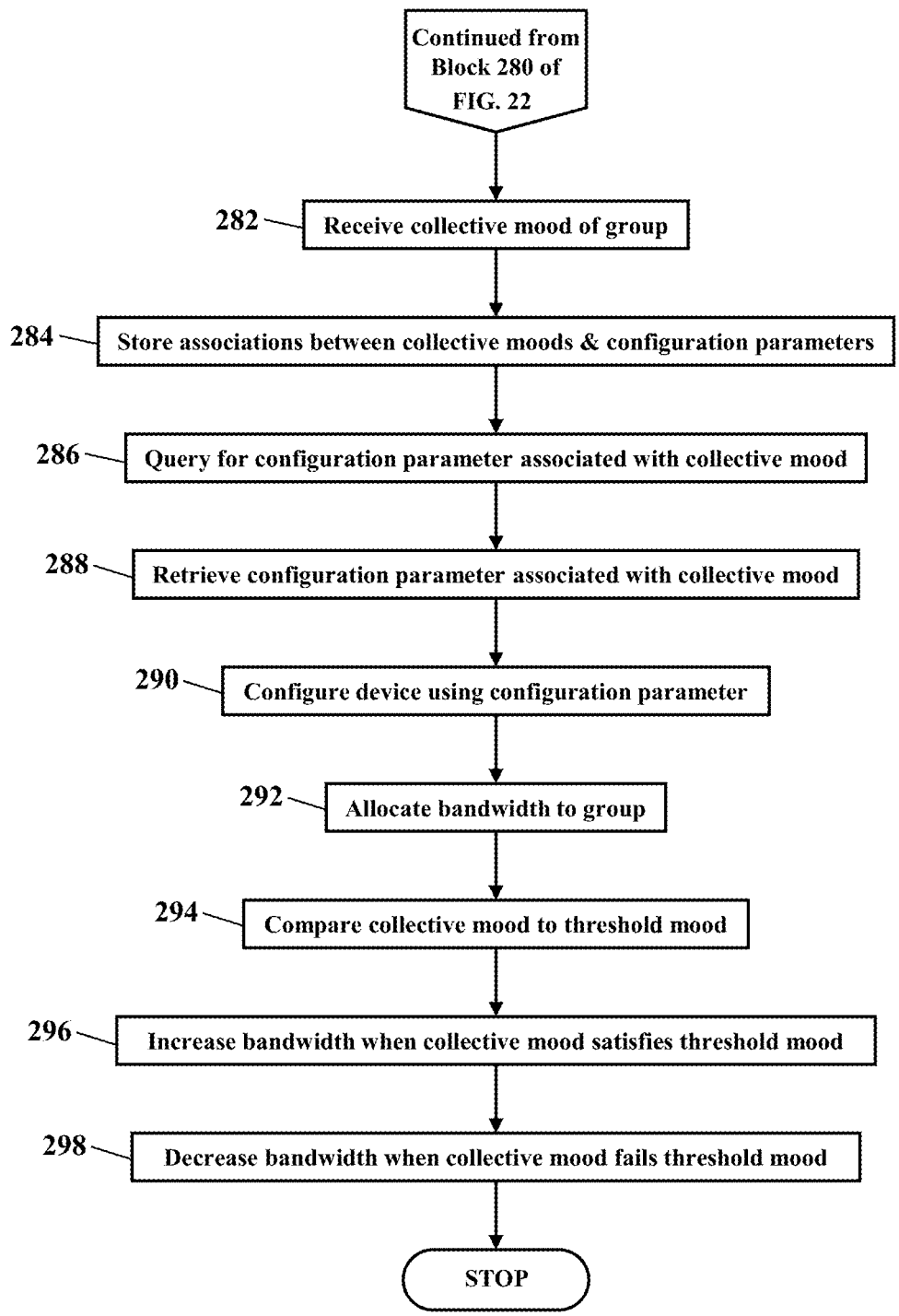

FIGS. 21-23 are flowcharts illustrating a method or algorithm for predicting mood, according to exemplary embodiments. The mood is received that is associated with the user's communications device (Block 250). The mood is compared to a threshold mood (Block 252). Mirror mood about the threshold mood (Block 254). A contrary mood is determined (Block 256). A query is made for social candidates having contrary mood (Block 258). Select social candidate having the contrary mood (Block 260). A communication is established with the social candidate (Block 262).

The algorithm continues with FIG. 22. Associations are stored between moods and configuration parameters of the device (Block 264). A query is made for at least one of the configuration parameters that is associated with the mood of the user (Block 266). The device is configured according to the mood of the user (Block 268). Memory may be allocated (Block 270), volume may be selected (Block 272), bandwidth may be allocated (Block 274), and/or a display may be configured (Block 276). Prohibited configuration parameters may also be stored and associated with the mood (Block 278). A configuration may be denied that is prohibited by the mood (Block 280).

The algorithm continues with FIG. 23. The collective mood of a group is received (Block 282). Associations are stored between collective moods and configuration parameters (Block 284). A query is made for at least one of the configuration parameters that is associated with the collective mood (Block 286). A configuration parameter is retrieved that is associated with the collective mood (Block 288). A device is configured with the configuration parameter (Block 290). Bandwidth may be allocated according to the collective mood (Block 292). The collective mood is compared to the threshold mood (Block 294). Bandwidth may be increased when the collective mood satisfies a threshold mood (Block 296). Bandwidth may be decreased when the collective mood fails to satisfy the threshold mood (Block 298).

Figure 24:
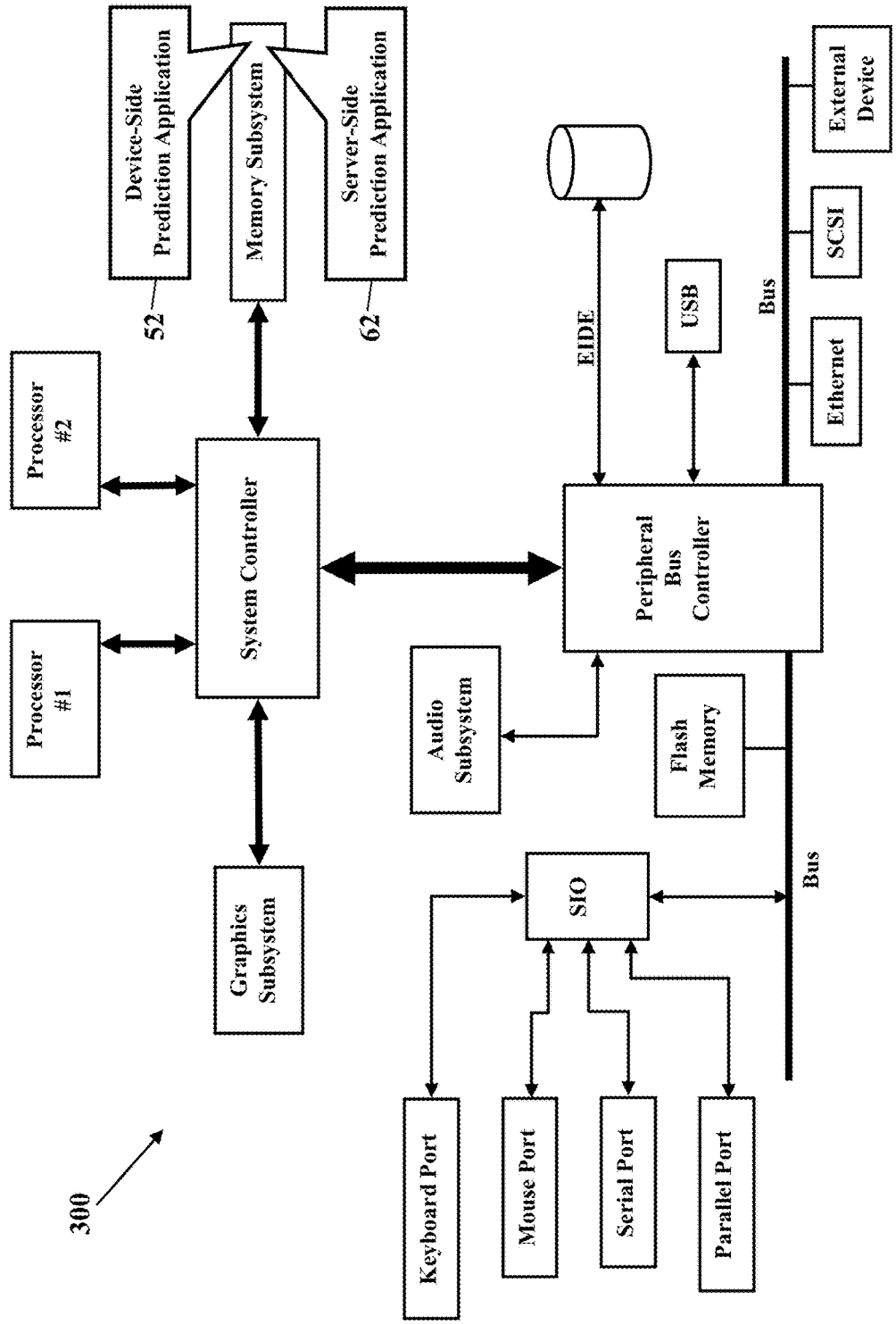
FIGS. 24-25 depict still more operating environments for additional aspects of the exemplary embodiments.

FIG. 24 is a schematic illustrating still more exemplary embodiments. FIG. 24 is a more detailed diagram illustrating a processor-controlled device 300. As earlier paragraphs explained, the device-side prediction application 52 and/or the server-side mood prediction application 62 may operate in any processor-controlled device. FIG. 24, then, illustrates the device-side prediction application 52 and the server-side mood prediction application 62 stored in a memory subsystem of the processor-controlled device 300. One or more processors communicate with the memory subsystem and execute either or both applications. Because the processor-controlled device 300 is well-known to those of ordinary skill in the art, no further explanation is needed.

Figure 25:
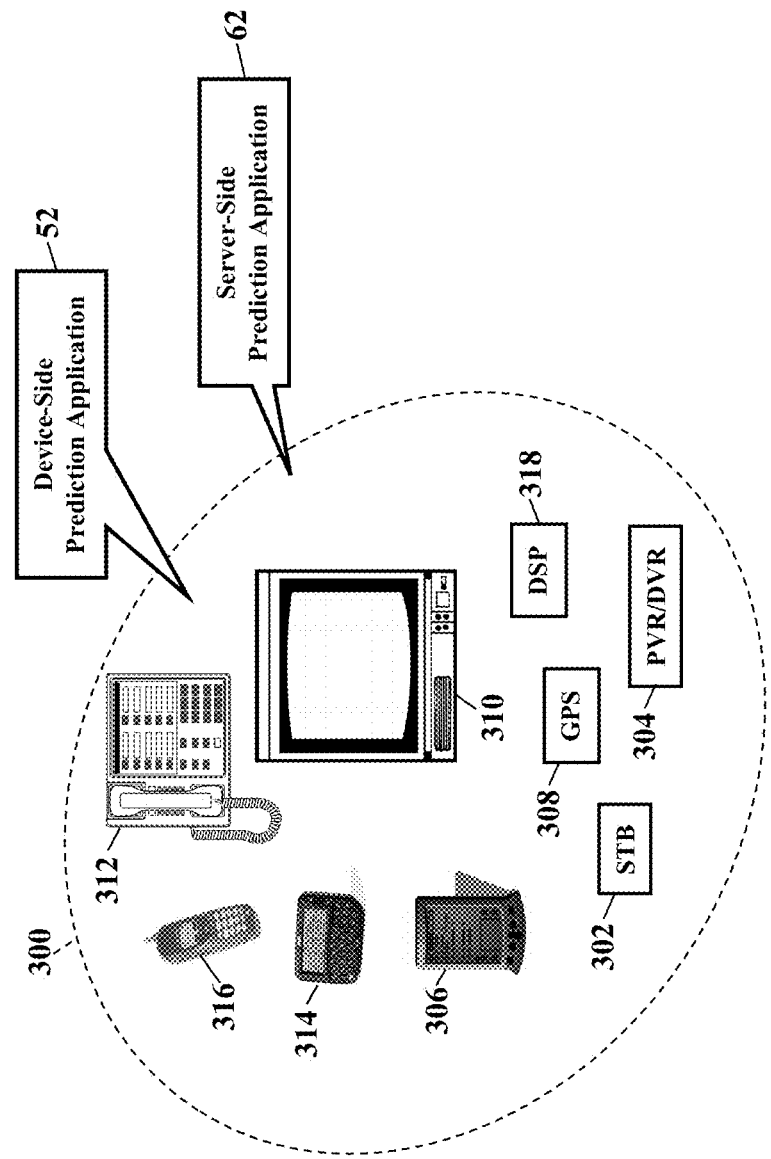

FIG. 25 depicts still more operating environments for additional aspects of the exemplary embodiments. FIG. 25 illustrates that the exemplary embodiments may alternatively or additionally operate within other processor-controlled devices 300. FIG. 25, for example, illustrates that the device-side prediction application 52 and the server-side mood prediction application 62 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or any processor-controlled device utilizing a digital signal processor (DP/DSP) 318. The processor-controlled device 300 may also include watches, radios, vehicle electronics, clocks, printers, gateways, mobile/implantable medical devices, and other apparatuses and systems. Because the architecture and operating principles of the various processor-controlled devices 300 are well known, the hardware and software componentry of the various processor-controlled devices 300 are not further shown and described.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. A computer program product comprises processor-executable instructions for predicting moods, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A communications device, comprising:

a hardware processor; and a memory device, the memory device storing instructions, the instructions when executed causing the hardware processor to perform operations, the operations comprising:

receiving electronic inputs to a keypad;

predicting a mood $M_P$ associated with a user of the communications device, the mood $M_P$ based on the electronic inputs to the keypad;

determining the user is distressed based on the mood $M_P$;

applying contrary mood matching in response to the user being distressed;

determining a contrary mood $M_{Con}$ to the mood $M_P$, the contrary mood $M_{Con}$ based on a threshold mood $M_{Th}$ with $M_{Th}-M_P=M_{Dif}$ and adding $M_{Th}+M_{Dif}=M_{Con}$;

querying an electronic database for the contrary mood $M_{Con}$, the electronic database electronically associating social friends and moods including the contrary mood $M_{Con}$;

identifying the social friends in the electronic database that are electronically associated with the contrary mood $M_{Con}$;

determining frequencies of contacts between the user of the communications device and the social friends that are electronically associated with the contrary mood $M_{Con}$;

pairing the user determined to be distressed with a social friend of the social friends based on a ranking of the frequencies of contacts;

retrieving a contact address associated with the social friend that is electronically associated with the contrary mood $M_{Con}$; and automatically sending a short messaging service text message to the contact address, the short messaging service text message initiating a contact with the social friend in response to the user being distressed.

2. The communications device of claim 1, wherein the operations further comprise retrieving a numerical spectrum of moods.

3. The communications device of claim 1, wherein the operations further comprise selecting the social friend having a highest rank.

4. The communications device of claim 1, wherein the operations further comprise assigning a predetermined textual phrase to a key in the keypad, the predetermined textual phrase based on the mood $M_P$.

5. A method, comprising:

logging, by a server, electronic inputs associated with a keypad of a mobile device;

determining, by the server, a mood $M_P$ associated with a user of the mobile device, the mood $M_P$ determined from the electronic inputs associated with the keypad of the mobile device;

determining, by the server, that the user is distressed based on the mood $M_P$ being less than a threshold mood $M_{Th}$;

determining, by the server, contrary mood matching in response to the user being distressed;

obtaining, by the server, a mirror rule in response to the determining of the contrary mood matching, the mirror rule defining a contrary mood $M_{Con}$ to the mood $M_P$, the contrary mood $M_{Con}$ based on $M_{Th}-M_P=M_{Dif}$ and adding $M_{Th}+M_{Dif}=M_{Con}$;

querying, by the server, an electronic database for the contrary mood $M_{Con}$, the electronic database electronically associating social friends and moods including the contrary mood $M_{Con}$;

identifying, by the server, the social friends in the electronic database that are electronically associated with the contrary mood $M_{Con}$;

determining, by the server, frequencies of contacts between the user of the mobile device and the social friends that are electronically associated with the contrary mood $M_{Con}$;

pairing, by the server, the user determined to be distressed with a social friend of the social friends based on a ranking of the frequencies of contacts;

determining, by the server, a network address associated with the social friend paired based on the ranking of the frequencies of contacts; and initiating, by the server, a short messaging service text message to the network address associated with the social friend paired based on the ranking of the frequencies of contacts, the short messaging service text message initiating a contact with the social friend having the contrary mood $M_{Con}$;

wherein the user determined to be distressed is communicatively paired via the short messaging service text message with the social friend having the contrary mood $M_{Con}$.

6. The method of claim 5, further comprising ranking the frequencies of messages exchanged between the mobile device and devices associated with the social friends having the contrary mood $M_{Con}$.

7. The method of claim 5, further comprising:
querying a contact list for the mood $M_P$ associated with the user determined to be distressed, the contact list electronically associating contact addresses and the moods including the mood $M_P$ associated with the user determined to be distressed;

identifying a contact address of the contact addresses in the contact list that is electronically associated with the mood $M_P$ associated with the user determined to be distressed; and sending the short messaging service text message to the contact address;

wherein the short messaging service text message notifies the contact address of the user determined to be distressed.

8. The method of claim 5, further comprising:
receiving a mood message sent via a communications network from the mobile device, the mood message specifying the mood $M_P$; and reducing network bandwidth allocated to the mobile device in response to the mood $M_P$;

wherein the communications network reduces the network bandwidth allocated to any user determined to be distressed based on the mood $M_P$.

9. The method of claim 5, further comprising:
receiving a mood message sent via a communications network from the mobile device, the mood message specifying the mood $M_P$; and increasing network bandwidth allocated to the mobile device in response to the mood $M_P$;

wherein the communications network increases the network bandwidth allocated to any user determined to be happy based on the mood $M_P$.

10. The method of claim 9, further comprising increasing cloud-based memory allocated to photos sent from the mobile device in response to the mood $M_P$.

11. The method of claim 5, further comprising:
querying a database of words for the mood $M_P$, the database of words electronically associating words to the moods;

retrieving emotional words from the database of words, the emotional words electronically associated with the mood $M_P$; and performing mood-based auto-correction to the electronic inputs associated with the electronic keypad, the mood-based auto-correction automatically spell-checking using the emotional words that are electronically associated with the mood $M_P$.

12. The method of claim 5, further comprising assigning a predetermined textual phrase to an electronic key in the keypad, the predetermined textual phrase based on the mood $M_P$.

13. A memory device storing processor executable instructions that when executed cause a hardware processor to perform operations, the operations comprising:
logging inputs to an electronic keypad, the electronic keypad associated with a mobile device;

determining a mood $M_P$ associated with a user of the mobile device, the mood $M_P$ determined from the inputs to the electronic keypad;

determining that the user is distressed based on the mood $M_P$ being less than a threshold mood $M_{Th}$;

determining contrary mood matching in response to the determining that the user is distressed;

obtaining a mirror rule in response to the determining of the contrary mood matching, the mirror rule defining a contrary mood $M_{Con}$ to the mood $M_P$, the contrary mood $M_{Con}$ forward projecting from the mood $M_P$ by adding $M_{Th}+M_{Dif}$ to determine the contrary mood $M_{Con}$, where $M_{Th}-M_P=M_{Dif}$;

querying an electronic database for the contrary mood $M_P$, the electronic database electronically associating social friends and moods including the contrary mood $M_{Con}$;

identifying the social friends in the electronic database that are electronically associated with the contrary mood $M_{Con}$;

determining frequencies of contacts between the user of the mobile device and the social friends that are electronically associated with the contrary mood $M_{Con}$;

pairing the user determined to be distressed with a social friend of the social friends based on a ranking of the frequencies of contacts; and automatically sending a short messaging service text message to a network address associated with the social friend paired based on the ranking of the frequencies of contacts, the short messaging service text message initiating a social contact;

wherein the user determined to be distressed is communicatively paired via the short messaging service text message with the social friend having the contrary mood $M_{Con}$.

14. The memory device of claim 13, wherein the operations further comprise querying an electronic database of tasks for the mood $M_P$ determined from the electronic inputs to the electronic keypad, the electronic database of tasks having electronic associations between tasks and the moods including the mood $M_P$.

15. The memory device of claim 14, wherein the operations further comprise retrieving a task from the electronic database of tasks, the task electronically associated with the mood $M_P$.

16. The memory device of claim 15, wherein the operations further comprise automatically executing the task that is electronically associated with the mood $M_P$ determined from the electronic inputs to the electronic keypad.

17. The memory device of claim 13, wherein the operations further comprise associating calendar entries in an electronic calendar with the moods, wherein each calendar entry of the calendar entries is associated with one of the moods.

18. The memory device of claim 17, wherein the operations further comprise sorting the calendar entries in an electronic calendar according to the moods.

* * * * *